(12) United States Patent
Wu et al.

(10) Patent No.: US 7,940,447 B2
(45) Date of Patent: May 10, 2011

(54) ELECTROCHROMIC DEVICE

(75) Inventors: Junjun Wu, Woodbury, MN (US); John E. Potts, Woodbury, MN (US); Clinton P. Waller, Jr., White Bear Lake, MN (US); Brian T. Weber, St. Anthony, MN (US); Jung-Sheng Wu, Woodbury, MN (US); Michael W. Lofgren, Forest Lake, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 22 days.

(21) Appl. No.: 11/566,548

(22) Filed: Dec. 4, 2006

(65) Prior Publication Data

US 2008/0128287 A1    Jun. 5, 2008

(51) Int. Cl.
*G02F 1/15* (2006.01)

(52) U.S. Cl. ......................................................... 359/265

(58) Field of Classification Search ........... 359/265–275
See application file for complete search history.

(56) References Cited

U.S. PATENT DOCUMENTS

| | | | |
|---|---|---|---|
| 4,787,717 A * | 11/1988 | Heinz geb Belgardt et al. .......................... | 359/272 |
| 4,841,021 A | 6/1989 | Katritzky et al. | |
| 4,851,308 A | 7/1989 | Akhtar | |
| 4,898,923 A | 2/1990 | Katritzky et al. | |
| 5,203,978 A | 4/1993 | Tsou et al. | |
| 5,208,111 A | 5/1993 | Decher et al. | |
| 5,631,765 A | 5/1997 | Baur et al. | |
| 5,825,526 A | 10/1998 | Bommarito et al. | |
| 5,919,574 A | 7/1999 | Hoagland | |
| 5,976,686 A * | 11/1999 | Kaytor et al. .............. | 428/317.9 |
| 5,989,717 A * | 11/1999 | Allemand et al. ........... | 428/426 |
| 6,144,479 A | 11/2000 | Lugg et al. | |
| 6,734,305 B2 | 5/2004 | Pierre et al. | |
| 6,791,738 B2 | 9/2004 | Reynolds et al. | |
| 6,831,769 B2 * | 12/2004 | Holman et al. ............... | 359/296 |
| 6,846,565 B2 * | 1/2005 | Korgel et al. ................ | 428/402 |
| 6,858,158 B2 | 2/2005 | Chittibabu et al. | |
| 6,861,014 B2 | 3/2005 | Fitzmaurice et al. | |
| 6,870,657 B1 | 3/2005 | Fitzmaurice et al. | |
| 7,333,257 B2 * | 2/2008 | Reynolds et al. ............ | 359/265 |
| 2001/0048498 A1 * | 12/2001 | Tomioka et al. .............. | 349/123 |
| 2003/0152703 A1 | 8/2003 | Hammond et al. | |

(Continued)

FOREIGN PATENT DOCUMENTS

EP    1535952 A1    6/2005

(Continued)

OTHER PUBLICATIONS

M. Ferreira, J. H. Cheung, M. F. Rubner, Thin Solid Films, 244 (1994) 806.

(Continued)

*Primary Examiner* — Ricky L Mack
*Assistant Examiner* — Tuyen Q Tra

(57) ABSTRACT

An electrode is described. The electrode has a substrate having a first and a second surface; a conductive layer; an electroactive layer that includes nanoparticles having an average size from 5 nm to 30 nm; at least one electroactive chemical and at least one organic binder material. The electroactive chemical binds to the surface of the nanoparticles. The conductive layer is disposed on the second surface of the substrate, and the electroactive layer is disposed on the conductive layer. Also described are electrochromic articles including the electrode, and a coating composition that can be utilized to fabricate the electrode.

4 Claims, 10 Drawing Sheets

U.S. PATENT DOCUMENTS

| | | | |
|---|---|---|---|
| 2004/0012869 A1* | 1/2004 | Hourquebie et al. | 359/883 |
| 2004/0053037 A1 | 3/2004 | Koch et al. | |
| 2004/0131934 A1* | 7/2004 | Sugnaux et al. | 429/209 |
| 2004/0150866 A1* | 8/2004 | Tench et al. | 359/265 |
| 2004/0233537 A1* | 11/2004 | Agrawal et al. | 359/604 |
| 2005/0205903 A1* | 9/2005 | Hioki | 257/291 |
| 2006/0083694 A1* | 4/2006 | Kodas et al. | 424/46 |
| 2006/0097233 A1 | 5/2006 | Pichot et al. | |
| 2007/0051403 A1 | 3/2007 | Itami | |
| 2008/0013152 A1* | 1/2008 | Hirano et al. | 359/265 |

FOREIGN PATENT DOCUMENTS

| | | |
|---|---|---|
| KR | 10-2000-0055936 | 9/2000 |
| KR | 10-2002-0030499 | 4/2002 |
| KR | 10-2006-0088152 | 8/2006 |
| WO | WO 02075826 A2 | 9/2002 |
| WO | WO 2004067672 A1 | 8/2004 |
| WO | WO 2004067673 | 8/2004 |
| WO | 2008/055311 | 5/2008 |

OTHER PUBLICATIONS

J. H. Cheung, A. F. Fou, M. F. Rubner, Thin Solid Films, 244 (1994) 985.

M. Ferreira, M. F. Rubner, Macromolecules, 28 (1995) 7107.

A. C. Fou, M. F. Rubner, Macromelcules, 28 (1995) 7115.

J. H. Cheung, W. B. Stockton, M. F. Rubner, Macromolecules, 30 (1997) 2712.

D. Wakizak, T. Fushimi, H. Ohkita, S. Ito, Polymer, 45 (2004) 8561.

Cinnsealach, R., Boschloo, G., Rao, S.N., Fitzmaurice, D. *Sol. Energy Mater. Sol. Cells* 1999, 57, 107.

C. A. Cutler, M. Bouguettaya, J. R. Reynolds, Adv. Mater., 14 (2002) 684.

D. Laurent, J. B. Schlenoff, Langmuir, 13 (1997) 1552.

D. M. DeLongchamp, M. Kastantin, P. T. Hammond, Chem. Mater. 15 (2003) 1575.

D. M. DeLongchamp, P. T. Hammond, Chem. Mater. 16 (2004) 4799.

X. Hong, J. Li, M. Wang, J. Xu, W. Guo, J. Li, Y. Bai, T. Li, Chem. Mater. 16 (2004) 4022.

T-H Kim, B-H Sohn, Appl. Surf. Sci. 201 (2002) 109.

O. Crespo-Biel, B. Dordi, D. N. Reinhoudt, J. Huskens, J. Am. Chem. Soc. 127 (2005) 7594.

W. B. Stockton, M. F. Rubner, Macromolecules 30 (1997) 2717.

S. Y. Yang, M. F. Rubner, J. Am. Chem. Soc., 124 (2002) 2100.

S. Bai, Z. Wang, X. Zhang, Langmuir, 20 (2004) 11828.

D. M. DeLongchamp, P. T. Hammond, Langmuir, 20 (2004) 5403.

Y. Shimazaki, M. Mitsuishi, S. Ito, M. Yamamoto, Langmuir, 13 (1997) 1385.

X. Wang, K. Naka, H. Itoh, T. Uemura, Y. Chujo, Macromolecules, 36 (2003) 533.

D. Li, Y. Jiang, Z. Wu, X. Chen, Y. Li, Thin Solid Films, 360 (2000) 24.

T. Moav, A. Hatzor, H. Cohen, J. Libman, I. Rubinstein, A. Shanzer, Chem. Eur. J., 4 (1998) 502.

A. Hatzor, T. Van der Boom-Maov, S. Yochelis, A. Vaskevich, A. Shanzer, I. Rubinstein, Langmuir 16 (2000) 4420.

T. Serizawa, S. Hashiguchi, M. Akashi, Langmuir, 15 (1998) 5363.

P. Kohli, G. J. Blanchard, Langmuir, 16 (2000) 8518.

Y. Lvov, K. Ariga, I. Ichinose, T. Kunitake, J. Chem. Soc., Chem. Commun., (1995) 2313.

J. Anzai, Y. Kobayashi, N. Nakamura, M. Nishimura, T. Hoshi, Langmuir, 16 (2000) 2851.

I. Suzuki, Y. Egawa, Y. Mizukawa, T. Hoshi, J. Anzai, J. Chem. Soc., Chem. Commun. (2002) 164.

Kim, J.H.; Shiratori, S.; "Characterization of $TiO_2$/Polyelectrolyte Thin Film Fabricated by a Layer-by-Layer Self-Assembly Method", Japanese Journal of Applied Physics, vol. 44, No. 10, 2005, pp. 7588-5792.

Grunlan, J.C.; "Fast-Switching, High-Contrast Electrochromic Thin Films Prepared Using Layer-by-Layer Assemby of Charged Species", Mater. Res. Soc. Symp. Proc., vol. 846, 2005 Materials Research Society, pp. DD11.2.1-DD11.2.6.

Xue, B.; Peng, J.; Xin, Z.; Kong, Y.; Li, L.; Li, B.; "High-contrast electrochromic multilayer films of molybdenum-doped hexagonal tungsten bronze ($Mo_{0.05}$-HTB)", Journal of Materials Chemistry, 2005, 15, pp. 4793-4798.

Liu, Y.; Wang, A.; Claus, R.; "Molecular Self-Assemby of $TiO_2$/Polymer Nanocomposite Films", J. Phys. Chem. B, vol. 101, No. 8, 1997, pp. 1385-1388.

Kim, E.; Jung, S.; "Layer-by-Layer Assembled Electrochromic Films for All-Solid-State Electrochromic Devices", Chem. Mater., vol. 17, No. 25, 2005, pp. 6381-6387.

Zacharia, N.; Hammond, P.T.; "Electrchromism of LBL Assembled Thin Polymer Films Containing Metal Oxide Nanoparticles", Polmeric Materials: Science & Engineering, 2003, 89, pp. 589.

Wang, Z.; Sasaki, T.; Muramatsu, M. Ebina, Y.; Tanaka, T.; Wang, L.; Watanabe, M.; "Self-Assembled Multilayers of Titania Nanoparticles and Nanosheets with Polyelectrolyes", Chem. Mater., vol. 15, No. 3, 2003, pp. 807-812.

Inorg. Chem., 45 (4), 1439-1441, 2006. 10.1021/ic051915n S0020-1669(05)01915-4.

Bonhote et al., "Novel electrochromic devices based on complementary nanocrystalline TiO2 and WO3 thin films", Elsevier, Thin Solid Films, 350, pp. 269-275, 1999.

\* cited by examiner

ELECTROCHROMIC DEVICE

BACKGROUND

The invention relates to electrochromic devices.

Electrochromic materials undergo a reversible change of color due to their oxidation or reduction. Devices incorporating these materials have been utilized in the construction of mirrors, displays, and windows for example. Nanoparticle based films can be useful in many electrochemical applications, examples of which include electrochromic devices, batteries, and solar cells. In order to control and fine tune such devices that include nanoparticle based films, it can be desirable to form uniform films. Currently utilized methods do not necessarily provide films with these characteristics, often lack the ability to precisely control the film composition and thickness, are difficult to produce films on a large scale, and are generally not amenable to low temperature processing. Therefore, there remains a need for methods of producing such films, components for producing the films, the films produced thereby, and electrochromic devices that include those films.

BRIEF SUMMARY

Described is an electrode having a substrate having a first and a second surface; a conductive layer; an electroactive layer that includes nanoparticles having an average size from 5 nm to 30 nm, and at least one electroactive chemical, wherein the electroactive chemical binds to the surface of the nanoparticles, at least one organic binder material, wherein the conductive layer is disposed on the second surface of the substrate, and the electroactive layer is disposed on the conductive layer.

Described is an electrochromic article that includes: a) a working electrode having a substrate with a first and a second surface; a conductive layer; an electroactive layer that includes nanoparticles having an average size from 5 nm to 30 nm; and at least one electroactive chemical, wherein the electroactive chemical binds to the surface of the nanoparticles; and at least one organic binder material, wherein the conductive layer is disposed on the second surface of the substrate, and the electroactive layer is disposed on the conductive layer; and b) an electrolyte layer disposed on the working electrode.

DETAILED DESCRIPTION

As used herein, "average diameter" refers to the average nominal diameter of the nanoparticles. Instances where particles with at least two average diameters are utilized, refers to the use of two separate particle compositions having at least two different average diameters.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a nanoparticle layer" includes two or more nanoparticle layers.

Figure 1:
FIG. 1 depicts an exemplary electrode in accordance with an embodiment.

One embodiment depicted in FIG. 1 includes an electrode 100 having a substrate 110, a conductive layer 120, and an electroactive layer 130.

Embodiments include at least one substrate 110. A substrate 110 generally includes a first surface 102 and a second surface 104. Generally, the surface of the substrate 110 that does not have other components of the electrode 100 placed thereon is referred to as the first surface 102 of the substrate 110. Contrary to that, the second surface 104 of the substrate 110 is the surface that has another component of the electrode 100 placed thereon. The type of substrate that will be used will depend at least in part on the final application and purpose of the device that is being fabricated. In one embodiment, the substrate can be transparent. The substrate can be either rigid or flexible. Embodiments provide the advantage of utilizing low drying temperatures which allows plastic substrates to be utilized. Examples of substrates include but are not limited to glass, polyethylene terephthalates (PETs), polyimides, polyethylene naphthalates (PENs), and polycarbonate. The substrate can also be a component of another device or the surface of another device or structure.

Embodiments also include a conductive layer 120. The conductive layer 120 is on the second surface 104 of the substrate 110. The conductive layer 120 allows the conduction of electricity from a source to the electroactive layer 130. The conductive layer 120 can include, but is not limited to, metal oxides such as indium tin oxide (ITO), tin oxide, fluorine doped tin oxide (FTO), zinc oxide, aluminum doped zinc oxide and antimony doped tin oxide (ATO). In other embodiments, vapor-deposited or electroless plated transparent metal films can be made using gold (Au), or silver (Ag); composites containing conductive nanowires; or thin carbon or metal grids can be utilized as the conductive layer 120. In another embodiment, a highly conductive polymer film, such as a highly conductive poly 3,4-ethylenedioxythiophene (PEDOT) film, can be coated (by appropriate methods) onto a substrate to function as the conductive layer. One of skill in the art will also understand, having read this specification, that a commercially available metal oxide coated substrate can also be utilized as the substrate 110 and conductive layer 120 of this embodiment.

Embodiments also include an electroactive layer 130. The electroactive layer 130 includes nanoparticles with bound electroactive chemicals and at least one organic binder. The electroactive layer 130 generally has a thickness of 2 micrometers (μm) to 20 μm. Another embodiment has an electroactive layer 130 that has a thickness of 3 μm to 15 μm. Another embodiment has an electroactive layer 130 that has a thickness of 4 μm to 12 μm.

The electroactive layer 130 can be formed from a solution containing a dispersion having nanoparticles with bound electroactive chemicals, at least one organic binder and at least one solvent. Generally, the solution containing the nanoparticles with bound electroactive chemicals, at least one organic binder, and at least one solvent is referred to herein as a coating composition, or a nanoparticle coating composition. The nanoparticle coating composition is generally formulated from and includes a dispersion containing the electroactive chemical and nanoparticles Dispersions utilized herein include nanoparticles. In one embodiment, any nanoparticle that can function to provide reversible electron transport through a structure of the nanoparticles can be utilized. In one embodiment of the invention, nanoparticles can be chosen based on at least two competing, but desirable, characteristics of a final layer that can be created with the dispersion; the porosity of the layer and the surface area per unit geometrical area of the particle layer. For example, in an instance where the electrode will ultimately be used in an electrochromic device, the porosity and the pore size of the layer contributes to the switching speed by permitting passage of the mobile ionic components in the electrolyte, and the surface area contributes to the contrast. It is generally desirable to have an electrochromic device that has a high contrast ratio. This provides a display that has a strong, vivid color (when the electroactive chemical is in one oxidation state) in comparison to the white or off white non-color (when the electroactive chemical is in the other oxidation state). It is also generally desirable to have an electrochromic display that has a fast switching speed from one color to another; generally from white (when a white background is used) to a color and vice versa (the switch from colored to white can also be referred to as bleaching). With respect to nanoparticles that are utilized in the invention, generally, use of smaller diameter particles will provide a larger surface area that may ultimately provide a higher contrast ratio. In contradiction to that, the use of larger particles will provide a layer having higher porosity and larger pore size, which may ultimately provide faster switching speeds by providing easy access to the ions in the electrolyte. These two opposing characteristics also play a role, albeit with different manifestations, in other applications.

Nanoparticles that are useful include semiconductive or conductive nanoparticles. Exemplary nanoparticles that can be utilized can be represented by the following general formula: $M_aX_b$, wherein M is a metal atom, including but not limited to, zinc (Zn), cadmium (Cd), mercury (Hg), indium (In), gallium (Ga), titanium (Ti), tungsten (W), lead (Pb), zirconium (Zr), vanadium (Va), niobium (Nb), tantalum (Ta), silver (Ag), cerium (Ce), strontium (Sr), iron ($Fe^{2+}$ or $Fe^{3+}$) nickel (Ni) or a perovskite thereof, and X can include, but is not limited to, oxygen (O), sulfur (S), selenium (Se), tellurium (Te), phosphorus (P), arsenic (As), and nitrogen (N); and a and b are stochiometric numbers. Mixtures of metal atoms may also be utilized as nanoparticles.

Specific examples of nanoparticles that can be utilized include, but are not limited to zinc oxide (ZnO), zinc sulfide (ZnS), zinc selenide (ZnSe), zinc tellurium (ZnTe), cadmium oxide (CdO), cadmium sulfide (CdS), cadmium selenide (CdSe), cadmium tellurium (CdTe), mercury sulfide (HgS), mercury selenide (HgSe), mercury tellurium (HgTe), indium phosphide (InP), indium arenside (InAs), gallium nitride (GaN), gallium phosphide (GaP), gallium arsenide (GaAs), titanium dioxide ($TiO_2$), tungsten trioxide ($WO_3$), antimony oxide (SbO), tin oxide (SnO), lead sulfide (PbS), and lead selenide (PbSe). In one embodiment metal oxides represented as $MO_x$, wherein M is as defined above, and x is an integer from 1 to 3, are utilized. In another embodiment titanium dioxide ($TiO_2$) is utilized as the nanoparticle.

Nanoparticles that are useful generally have an average diameter that is from 5 nanometers (nm) to 50 nm. In one embodiment, from 5 nm to 30 nm. In one embodiment, from 7 nm to 21 nm. In one embodiment where the nanoparticles are $TiO_2$, a commercially available nanoparticle with an average diameter of 21 nm is P25, available from Degussa AG (Dusseldorf, Germany). In one embodiment, nanoparticles with an average diameter of 7 nm are utilized. In one embodiment where the nanoparticles are $TiO_2$, a commercially available nanoparticle with an average diameter of 7 nm is ST-01, available from Ishihara Corporation USA (San Francisco, Calif.). In yet another embodiment, two different average diameter nanoparticles are utilized in one dispersion. In yet a further embodiment, particles with an average diameter of 7 nm and particles with an average diameter of 21 nm are utilized. In one embodiment where the nanoparticles are $TiO_2$ nanoparticles, a commercially available nanoparticle with an average diameter of 7 nm, referred to as ST-01 and a commercially available nanoparticle with an average diameter of 20 nm, referred to as ST-21, are available from Ishihara Corporation USA.

Generally, smaller nanoparticles will provide larger specific surface area than will larger nanoparticles. The specific surface area of a particle is the total surface area per volume or weight of a solid. Specific surface areas are reported herein as square meter per gram ($m^2/g$). Generally, nanoparticles that can be utilized have a specific surface area of at least 20

$m^2/g$. In one embodiment, nanoparticles that can be utilized have a specific surface area of at least 50 $m^2/g$. In another embodiment nanoparticles that can be utilized have a specific surface area of 50 $m^2/g$ to 300 $m^2/g$. Some embodiments will include the use of two different diameter nanoparticles that have specific surface areas of 50 $m^2/g$ and 300 $m^2/g$ respectively.

As mentioned above, as smaller diameter nanoparticles are used in a dispersion, the specific surface area of the nanoparticles increases, and for example, the contrast ratio of an electrochromic display that is fabricated using that dispersion can be higher than an electrochromic display that is fabricated using a dispersion with lower specific surface area particles (assuming the layer thicknesses are the same). Also, as smaller diameter nanoparticles are used in a dispersion, the pore size of the channels within a layer that is formed using that dispersion decreases. The channels permit the movement of ions through the electrolyte during device operation. For example, an electrochromic display that includes such a layer can have a slower switching speed than an electrochromic display that is fabricated using a dispersion with larger diameter nanoparticles. As seen here, these two exemplary desirable properties of an electrochromic display have to be weighed against each other when determining the size of the nanoparticle that is to be used when fabricating a device using a dispersion.

In an embodiment where nanoparticles having two different average diameters are utilized, the ratio of the amounts of the two particles is chosen based on the consideration of two different properties of the final film or device (contrast vs. switching speeds). Larger ratios (or amounts) of larger particles will increase the average pore size of a final layer, but will decrease the specific surface area of the particles which decreases the amount of electroactive chemical bound to the particles. Conversely, larger ratios (or amounts) of smaller particles will decrease the average pore size of a final layer, but will increase the specific surface area of the particles which increases the amount of electroactive chemical bound to the particles. In an embodiment where the dispersion will be used to create a film or layer that is used in an electrochromic device, larger amounts of larger particles will therefore increase the switching speed, and decrease the contrast ratio; and larger amounts of smaller particles will therefore decrease the switching speed, and increase the contrast ratio.

Generally dispersions utilized herein include nanoparticles in an amount that is capable of providing layers or coatings with desired properties. It will be understood by one of skill in the art, having read this specification that the amount of nanoparticles present in a dispersion can depend, at least in part, on the particle size of the nanoparticles. For example, if smaller particles, i.e. particles having a greater specific surface area are utilized, a smaller weight percent of the nanoparticles can be utilized in a dispersion.

In one embodiment, a dispersion includes not more than 50 wt-% of nanoparticles. In another embodiment, a dispersion includes not more than 40 wt-% of nanoparticles. In one embodiment the nanoparticles are present in an amount from 30 to 40 wt-% of the dispersion.

Dispersions utilized herein also include electroactive chemicals. Electroactive chemicals include chemicals that can be used as the active species in electrochemical devices such as photovoltaic cells, electrochromic devices and batteries.

When used in a dispersion, a suitable electroactive chemical should be capable of binding to the surface of the nanoparticle. This binding can be based on the particular structure of the electroactive chemical, the atomic structure of the nanoparticle, the nanostructure of the nanoparticle agglomerates, a surface treatment that is applied to the nanoparticle, or some combination thereof. In one embodiment, the surface of the nanoparticles is capable of binding the electroactive chemical due to a functional portion of the electroactive chemical. For example, the surface of the nanoparticles can be capable of binding an electroactive chemical that includes a specific chemical group. Exemplary chemical groups that can be included in electroactive chemicals include, but are not limited to, phosphonate groups, carboxylate groups, and sulfonate groups. Such exemplary groups can bind to $Ti^{+4}$ sites on the $TiO_2$ nanoparticle surfaces. In such an embodiment, both charge interaction and chemical bonding may be taking place between the $TiO_2$ particles and the electroactive chemicals. In one embodiment, electroactive chemicals that include phosphonate groups are utilized.

Electroactive compounds which may be utilized in dispersions include, but are not limited photosensitizers, electrochromophores, other redox species, and electroluminescent molecules.

Exemplary electroactive chemicals for use in forming dispersions to fabricate electrochromic devices include, but are not limited to ruthenium (II) complexes, polyanilines, polypyridyl complexes, viologen, and derivatives thereof. Exemplary electroactive chemicals for use in electrochromic devices also include those disclosed and exemplified in U.S. Pat. Nos. 4,841,021; and 4,898,923, the disclosures of which are incorporated herein by reference.

In an embodiment where the dispersion can be used to fabricate an electrochromic device, one possible electroactive chemical includes viologen or derivatives thereof. Further information regarding viologen can be found in: The Viologens, Physicochemical Properties, Synthesis and Applications of the Salts of 4,4'-Bipyridine", Author: P. M. S. Monk, Publisher: John Wiley & Sons, 1998. Viologen, as referred to herein includes viologen and derivates thereof and can be represented by Formula I below:

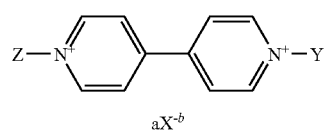

Formula I wherein at least one of Z and Y has a functional group that can bind to a surface of a nanoparticle in the dispersion;

a is 1 or 2; and b is 1 or 2, with the proviso that $aX^{-b}$ balances the charge of the two $N^+$ in the rings.

In one embodiment, Z and Y independently contain a phosphonate group, a carboxylate group, or a sulfonate group. In one embodiment, X is chloride, fluoride, iodide, or bromide; a is 2; and b is 1.

One specific example of a modified viologen that can be utilized in a dispersion includes 1,1'-bis(2-phosphonoethyl)-4,4'-bipyridinium dichloride, the structure of which is given below.

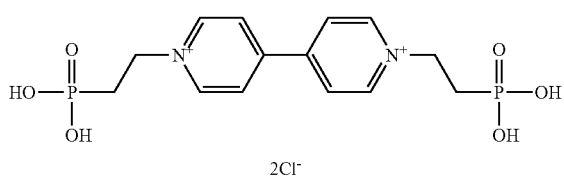

It is thought, but not relied upon, that, in a dispersion that utilizes a modified viologen (as exemplified above) and $TiO_2$ nanoparticles, the strong interaction between the phosphonate groups of the viologen and the $TiO_2$ surface binds the viologen molecules covalently to the surface of the $TiO_2$ nanoparticles.

Exemplary photosensitizers that can be used as electroactive chemicals in dispersions that can be utilized to form solar cells, include but are not limited to, the family of ruthenium (II) complexes widely used in dye sensitized solar cells (DSSC); such as bis(2,2'-bipyridine)(2,2'-bipyridine-4,4'-dicarboxylic acid)ruthenium(II) complex, other metal-containing dyes such as, for example, cis-bis(isothiocyanato)bis(2,2'-bipyridyl-4,4'-dicarboxylato)-ruthenium(II) (""N3 dye"); tris(isothiocyanato)-ruthenium(II)-2,2':6',2'-terpyridine-4,4', 4'-tricarboxylic acid; cis-bis(isothiocyanato)bis(2,2'-bipyridyl-4,4'-dicarboxylato)-ruthenium(II) bis-tetrabutylammonium; cis-bis(isocyanato)(2,2'- bipyridyl-4,4' dicarboxylato) ruthenium (II); and tris(2,2'-bipyridyl-4,4'-dicarboxylato) ruthenium (II) dichloride; anthocyanins, porphyrins, phthalocyanines, merocyanines, cyanines, squarates, eosins (most are commercially available from Solaronix, Switzerland). Other photosensitizing dyes including those with appropriate anchoring groups that can bind to the surface of the nanoparticles can also be utilized.

Generally, the amount of the electroactive chemical that is in a dispersion is at least partially dependent on the total surface area of the nanoparticle in the dispersion because the electroactive chemical binds to the surface of the nanoparticle. Therefore, the more overall nanoparticle surface area there is in a dispersion, either due to the amount of nanoparticles in the dispersion or the size of the nanoparticles, the more electroactive chemical that can bind to the surface of the nanoparticles. Conversely, once enough electroactive chemical is provided in the dispersion to bind to all of the active portions of the surface of the nanoparticles, any excess electroactive chemical will participate in the equilibrium that will develop between the electroactive chemical in solution and that which is bound to the surface of the nanoparticle. One of skill in the art, having read this specification will also understand that the equilibrium that is established between the bound and free electroactive chemical can be affected by the pH and or ionic strength of the solution.

Generally, the electroactive chemical is utilized in solution. In one embodiment, the electroactive chemical is an aqueous solution when it is mixed with the nanoparticles. Other polar solvents, such as methanol, ethanol, methoxy-2-propanol, or mixtures thereof can also be utilized. In one embodiment, the pH, or ionic strength of the solution can be modified before the solution is mixed with the nanoparticles.

In one embodiment, the electroactive chemical can be present from 1 millimolar (mM) to 100 mM. In another embodiment, the electroactive chemical can be present from 10 mM to 100 mM. In another embodiment, the electroactive chemical can be present from 20 mM to 75 mM. In yet another embodiment, the electroactive chemical can be present from 20 mM to 50 mM when combined in a solution having P25 $TiO_2$ at 30 wt-% to 40 wt-%.

Dispersions that are utilized will include agglomerates. Agglomerates form when two or more particles bind together during and/or after particle synthesis either through van der Waals forces, chemical bonding, or a combination thereof Agglomerates in the dispersion will have different, non-uniform diameters. Generally, dispersions that can be utilized have a majority of agglomerates that have submicron average diameters. Often, dispersions that can be utilized will have a bimodal or monomodal distribution of the diameter of agglomerates. However, regardless of the distribution, dispersions that are utilized have more agglomerates that have a submicron diameter than those with larger diameters. In one embodiment, a dispersion that can be utilized includes a majority of agglomerates that have an average diameter that is not greater than 1 µm. In one embodiment, a dispersion that can be utilized includes a majority of agglomerates that have an average diameter that is not greater than 500 nm. In another embodiment, a dispersion that can be utilized includes a majority of agglomerates that have an average diameter that is not greater than 100 nm.

Generally, dispersions with smaller agglomerate sizes tend to form layers that have more controlled and/or reproducible structures. More specifically, dispersions with smaller agglomerate sizes can tend to form layers that have a more controlled porosity, perhaps not a higher porosity, but more reproducible. Dispersions with smaller agglomerate sizes and narrower size distribution also tend to form layers with less surface roughness. Porosity of a layer can be important in instances where the layers are to be part of an electrochromic device for example, because porosity and pore size contribute to a fast and/or reproducible switching speed of the final electrochromic device. Solutions with smaller agglomerate size can also tend to form layers that have a more constant and higher surface coverage of electroactive chemical. Otherwise, the internal surface in a large agglomerate is not accessible to electroactive chemicals, thus resulting in lower surface coverage. Surface coverage of electroactive chemical can be important because high surface coverage of viologen, for example can also contribute to the switching speed of a final electrochromic device. Smaller agglomerate sizes can also contribute to reproducibly being able to control the thickness of the layers that are formed with the solution. In one embodiment, this can contribute to creating an electrochromic device with a good contrast ratio.

Agglomerate size of a solution can be determined as is well known to those of skill in the art. One exemplary method of determining agglomerate size includes use of a Diffraction Particle Size Analyzer, such as a LA-910 Laser Scattering Particle Size Distribution Analyzer (Horiba Instruments, Inc., Irvine, Calif.).

In one embodiment a dispersion is formed by initially mixing the nanoparticles with a solution containing the electroactive chemical and then dispersing the mixture by high shear force or attrition. One of skill in the art will understand that the mixing and dispersing step can be carried out in one step or in multiple steps. During these steps, the electroactive chemical binds to the surface of the nanoparticles. The resultant solution or dispersion has an agglomerate size that is in the submicron range, as discussed above.

The initial mixing step can be accomplished using any method known to those of skill in the art, including but not limited to, the use of a mixing device. The function of the initial mixing step is to create a dispersion that is flowable on a large scale and reduce the large agglomerates for further processes. One of skill in the art, having read this specification, will also understand that the initial mixing step can be eliminated and the step of dispersing the materials in the dispersion can function to create a homogenous solution.

After the initial mixing of the nanoparticles with the solution containing the electroactive chemicals, the mixture is dispersed. Generally, the function of the dispersing step is to form a dispersion, including a majority of agglomerates with a submicron diameter. Any method that can produce such a solution from the starting materials can be utilized herein. Generally, solutions containing nanoparticles with diameters of less than 20 nm will form solutions that have a majority of agglomerate sizes that are greater than submicron if a dispersion step is not utilized. The dispersion step can be accomplished using any method known to those of skill in the art, including but not limited to, the use of a microfluidizer® (Microfluidics Corp. Newton, Mass. for example), homogenizer (Gaulin 15 MR-8TA homogenizer from APV Gaulin, Minneapolis, Minn., for example), media mill (MiniCer from Netzsch Incorporated, Exton, Pa. for example), high shear mixing (Ulta-Turrax mixer from IKA Works, Inc. Wilmington Del., for example), or ultrasonicator (Misonix, Farmingdale, N.Y. or VirSonic Ultrasonic, VirTis—an SP Industries Company, Gardiner N.Y. for example).

In one embodiment, the dispersing step is accomplished by using a microfluidizer® from Microfluidics (Newton, Mass.) with serial 250 μm and 85 μm interaction chambers operated at about 10,000 to 30,000 psi for up to 8 to 16 passes. The final agglomerate size and size distribution can be easily controlled by either adjusting the pressure or the number of passes.

It should be noted that electroactive chemical bound nanoparticle dispersions can be used to form films or layers of nanoparticle/electroactive chemical without further processing. For example, it is not necessary to isolate the agglomerates, dry them, and redissolve them in order to use them in the fabrication of films or layers. It is thought, but not relied upon that this extra processing step is not necessary because the agglomerate size in the dispersion is controlled. Elimination of further processing steps can offer an advantage in process time, efficiency and economics.

Once a dispersion is prepared, it is generally a stable solution. As used herein, a stable solution refers to a solution that does not have particles falling out of solution (precipitating), or creating a two phase solution. Solutions that are stable also have agglomerates that remain suspended in solution. A stable solution also does not change viscosity during non-use or storage. As used herein, a stable solution does not refer to any electrical properties of the electroactive chemical. Generally, dispersions are stable for at least one day. In another embodiment, dispersions are stable for at least one week. In another embodiment, dispersions are stable for at least one month or longer.

The dispersions discussed above are used to form a coating composition. A coating composition as utilized herein includes a dispersion, at least one organic binder material, and at least one solvent. A coating composition can be coated onto a substrate to form the electroactive layer 130.

In one embodiment, a coating composition that can be utilized includes from 5 wt-% to 25 wt-% of the electroactive chemical bound nanoparticle dispersion. In an embodiment where screen printing is utilized, a coating composition includes from 10 wt-% to 20 wt-% of the electroactive chemical bound nanoparticle dispersion.

A coating composition also includes at least one organic binder material. Organic binder materials are materials that can function as a viscosity modifier, have film forming properties, can add mechanical strength to films that are formed therewith, or some combination thereof. Generally, the at least one organic binder has a minimal solubility in polar solvents and/or high boiling point solvents. Generally, the at least one organic binder material is compatible with other solvents in the coating composition. Also, the at least one organic binder is compatible with the dispersion so that a homogenous solution is created and maintained when combined with the dispersion. In situations where the coating composition is to be used to create one layer of a multilayered device, it is generally desirable that the organic binder not be soluble in other materials that it may come in contact with. A specific example of this includes the use of the coating composition in fabricating a portion of an electrochromic device or article. In such an example, the coating composition could be used to fabricate the electroactive layer 130 for example. In such a case, it would be desirable if the organic binder material were insoluble in the electrolyte with which the electroactive layer 130 may be in contact.

In one embodiment, organic binder materials that are utilized include high molecular weight polymers. Exemplary materials include, but are not limited to polyethylene oxide (PEO), polyvinyl alcohol (PVA), or polyacrylic acid (PAA). In one embodiment, the organic binder is an alkyl cellulose ether. Examples of alkyl cellulose ethers include, but are not limited to methyl cellulose, hydroxypropyl methyl cellulose and derivatives of hydroxyethyl cellulose. In one embodiment, a methyl cellulose ether is utilized. Suitable methyl cellulose ethers are commercially available from Dow Chemical (Midland Mich.). Specific examples of methyl cellulose ethers that can be utilized include METHOCEL E4M from Dow Chemical.

In one embodiment, the at least one organic binder is present in the coating composition from 0.5 wt-% to 2.0 wt-%. In another embodiment, the at least one organic binder is present in the coating composition from 1 wt-% to 2.0 wt-%. In yet another embodiment the at least one organic binder is present in the coating composition from 1 wt-% to 1.5 wt-%.

A coating composition also includes at least one solvent. The at least one solvent generally functions to mix the dispersion and the organic binder. It can also function to allow the coating composition to be coated onto the substrate. In one embodiment therefore, any solvent that can accomplish this function can therefore be included in a coating composition. In another embodiment, there is at least one solvent in the coating composition that can function to control the rate at which the coating composition dries once it is applied to a surface. In such an embodiment it can be beneficial to include at least one solvent that has a high boiling point. In one embodiment there is at least one solvent in the coating composition that is a polar solvent. In one embodiment, there is at least one solvent in the coating composition that is compatible with an aqueous dispersion.

In one embodiment, the at least one solvent is water. In another embodiment, water and a second organic solvent are both utilized. In one embodiment, the second solvent is a glycol ether. In one embodiment, the second solvent is ethylene glycol ether; propylene glycol ether; N-methyl pyrrolidone; butyrolactone; alcohols, such as ethyl, isopropyl, sec-butyl, n-butyl, methyl; or combinations thereof One exemplary glycol ether that can be used as the second solvent includes diethylene glycol monoethylether.

In one embodiment, the at least one solvent is present in the coating composition from 75 wt-% to 95 wt-%. In an embodiment where screen printing is utilized, the at least one solvent is present in the coating composition from 80 wt-% to 90 wt-%. In yet another embodiment where screen printing is utilized, the at least one solvent is present in the coating composition from 83 wt-% to 89 wt-%. In one embodiment, a coating composition utilizes both water and an organic solvent. In such embodiments, the water can be present at 40 wt-% to 50 wt-%, at 44 wt-% to 50 wt-% or at 47 wt-% to 50 wt-%. In such embodiments, the organic solvent can be present at 35 wt-% to 45 wt-%, at 37 wt-% to 42 wt-%, or at 39 wt-% to 40 wt-%.

Coating compositions that can be used to form the electroactive layer 130 can also optionally include one or more redox promoters. Examples of redox promoters include, but are not limited to, ferrocene, and derivatives thereof. In one embodiment, ferrocene carboxylic acid is used.

In one embodiment, from 0.01 wt-% to 1 wt-% of a redox promoter is utilized in a coating composition. In another embodiment, from 0.02 wt-0% to 0.07 wt-% of a redox promoter is utilized in a coating composition. In yet another embodiment, from 0.04 wt-% to 0.06 wt-% of a redox promoter is utilized in a coating composition. In one embodiment where ferrocene carboxylic acid is utilized in a coating composition, the coating composition includes 0.05 wt-% ferrocene carboxylic acid.

Ferrocene (FC) undergoes a very fast electrochemical redox process. It is known that the inclusion of ferrocene in an electrolyte can enhance switching rates in electrochromic devices by working as a redox promoter. In particular during bleaching when a positive bias that is higher than the redox potential of ferrocene is applied at the working electrode, the oxidized form of ferrocene will accumulate near the working electrode surface. The oxidized ferrocene will help to oxidize the reduced viologen cation radical and may thus enhance the bleaching rate. However, because ferrocene can diffuse in an electrolyte, such a device will self erase within a very short period of time in open circuit condition and the stability of the colored state will be lost. However, when added to the coating composition, the nanoparticles become doped with the redox promoter. One example utilizes a negatively charged derivative of ferrocene for example, ferrocene carboxylic acid, as the redox promoter. In such a case, the ferrocene carboxylic acid, which will be negatively charged a the conditions commonly employed in the coating composition, will bind to the surface of the electroactive chemical bound nanoparticle and will therefore not be able to diffuse into the electrolyte. As a result, the switching (bleaching in particular) rate may be enhanced without adversely affecting the device's stability.

Coating compositions that can be utilized to form electroactive layer 130 can also optionally include other components. Such components would be known to those of skill in the art, having read this specification, and can include for example, pH modifying additives, antifoaming agents, and wetting agents. In one embodiment, a pH modifying additive is utilized to increase the pH of the coating composition. An example of such an additive includes ammonia ($NH_4OH$). It may also be necessary in some coating compositions to decrease the pH of the coating composition, appropriate acids can be utilized in such instances. In one embodiment, an antifoaming agent is utilized. An example of such an additive includes Dow Corning additive 71 (Dow Corning, Midland Mich.). In one embodiment, a wetting agent is utilized. An example of such an additive includes Dow Corning additive 57 (Dow Corning, Midland Mich.).

Coating compositions that are utilized to form the electroactive layer 130 can be applied to conductive coated substrates via any coating method known to those of skill in the art. Generally, coating methods that can produce substantially uniform coatings are utilized. Examples of such methods include, but are not limited to, knife coating, screen printing, extrusion coating, gravure coating, reverse gravure coating, and ink jet coating. In one embodiment, screen printing is utilized. Screen printing, gravure coating, and reverse gravure coating can all be advantageous because they can afford the ability to deposit the coating composition in a specific pattern on the substrate.

Coating compositions that can be utilized are generally formulated to have a viscosity of less than 100 Pa·sec. In one embodiment, a coating composition that can be utilized has a viscosity from 0.1 Pa·sec to 100 Pa·sec. In an embodiment where screen printing is utilized, a coating composition that can be utilized has a viscosity of from 1 Pa·sec to 10 Pa·sec. Coating compositions that are utilized are also formulated to have greater than 85 wt-% nanoparticles in a dried electroactive layer. In another embodiment, the coating composition is formulated to have greater than 90 wt-% nanoparticles in a dried electroactive layer. These amounts of nanoparticles provide electroactive layers with good connectivity between particles, which provides good electrical conductivity and are also better able to withstand swelling by the electrolyte layer, which leads to better device stability.

The electroactive layer that is formed from a coating composition is generally a high porosity layer. This enables the electrolyte to penetrate throughout the regions where the electroactive chemical is bound. In one embodiment, the electroactive layer has a porosity of at least 40%. In one embodiment, the electroactive layer has a porosity of at least 50%. In another embodiment the electroactive layer has a porosity of at least 60%. In one embodiment, the average pore size in an electroactive layer is at least 5 nm. In another embodiment, the average pore size in an electroactive layer is at least 10 nm. Generally the electroactive layer functions to conduct electrons or holes through the porous portions of the nanoparticle structure to the electroactive chemical bound thereon so it can be electrically modified (i.e. reduced or oxidized for example).

Figure 2:
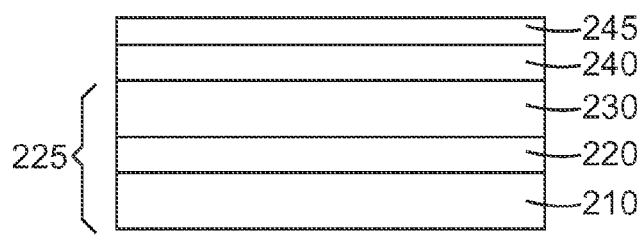
FIG. 2 depicts an exemplary electrochromic device in accordance with an embodiment.

Another embodiment, depicted in FIG. 2 includes a device that includes a working electrode 225, and an electrolyte layer 240. In such an embodiment, the electrolyte layer 240 is disposed on the working electrode 225. The working electrode 225 in this embodiment can include the electrode exemplified in FIG. 1, and described above.

The electrolyte layer 240 functions to facilitate the transfer of electrical charge from a ground potential or a current source to the electroactive chemical. Examples of electrolytes that can be used to form the electrolyte layer 240 include, but are not limited to solvent based liquid electrolytes, polyelectrolytes, polymeric electrolytes, solid electrolytes, gel electrolytes, and UV curable electrolytes. Examples of specific electrolyte salts that can be utilized include, but are not limited to poly(vinyl imidazolium halide) and lithium iodide, poly(vinyl pyridinium salts), $LiN(CF_3SO_2)_2$ (commercially available as Fluorad HQ 115 from 3M, St. Paul Minn.), $LiCF_3(SO_3)$ (lithiumtriflate) (commercially available from 3M, St. Paul Minn.). During functioning of the device, at least some components of the electrolyte layer penetrate the working electrode 225 in order to convey ionic components to the electroactive chemical bound nanoparticle.

One embodiment includes a curable electrolyte that is disclosed in a US Patent Application, filed on the same day as this application, entitled "CURABLE ELECTROLYTE", Ser. No 11/566,509, the disclosure of which is incorporated herein by reference.

One embodiment also includes an optional release liner 245 positioned on the electrolyte layer 240 (depicted in FIG. 2). The release liner 245 can be formed of any useful material such as, for example, polymers or paper and may include a release coat. Suitable materials for use in release coats include, but are not limited to, fluoropolymers, acrylics and silicones designed to facilitate the release of the release liner 245 from the electrolyte layer 240. Such an embodiment could be useful if the electrode/electrolyte were manufactured and sold separately from the remaining components of an electrochromic device.

Figure 3:
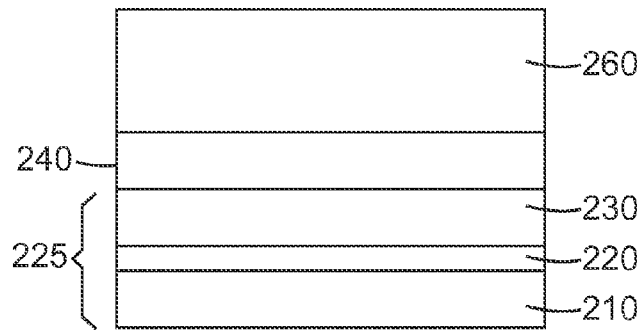
FIG. 3 depicts an exemplary electrochromic device in accordance with an embodiment.

Yet another embodiment, an example of which is depicted in FIG. 3 includes a working electrode 225 that includes a first substrate 210, a first conductive layer 220, and an electroactive layer 230; an electrolyte layer 240; and a counter electrode 260. The working electrode 225, and the electrolyte layer 240 are generally as described above.

The counter electrode 260 can be fabricated by any method known to those of skill in the art. Generally, the counter electrode is a layer, or layers, that provides the charges which enable the redox counterpart to the process occurring at the working electrode. Generally, the layer or layers of the counter electrode are formed on a substrate. The characteristics of the substrate, as well as exemplary types of substrates can generally be the same as those described above with respect to the working electrode. Some embodiments can also include counter electrodes that include antimony doped zinc oxide (AZO) nanoparticles.

In an embodiment wherein the counter electrode contains AZO, the AZO can be combined with at least one organic binder and at least one solvent to form a counter electrode coating composition. In one embodiment the counter electrode coating composition can include from 20 wt-% to 35 wt-% AZO. In another embodiment, the counter electrode coating composition can include from 20 wt-% to 25 wt-% AZO. In yet another embodiment, the counter electrode coating composition can include about 24 wt-% AZO.

The counter electrode coating composition also includes at least one organic binder. The organic binders that can be used to form the counter electrode coating composition are the same as those that were discussed with respect to the formation of the working electrode above. In one embodiment, the counter electrode coating composition contains from 0.5 wt-% to 1.5 wt-% of the at least one organic binder. In another embodiment, the counter electrode coating composition contains from 0.75 wt-% to 1.25 wt-% of the at least one organic binder. In yet another embodiment, the counter electrode coating composition contains about 1 wt-% of the at least one organic binder.

The counter electrode coating composition also includes at least one solvent. The at least one solvent that can be used to form the counter electrode coating composition are the same as those that were discussed with respect to the formation of the working electrode above. In one embodiment, the counter electrode coating composition includes water, at least one alcohol, and at least one glycol ether as solvents. In yet another embodiment, the counter electrode coating composition includes water, methanol, and diethylene glycol monoethyl ether as solvents. In even a further embodiment, the counter electrode coating composition includes water, methanol, and DOWANOL™ tripropylene glycol methyl ether (TPM) (Dow Chemical Company, Midland Mich.) as solvents. In one embodiment, a counter electrode coating composition includes from 55 wt-% to 90 wt-% of solvent (one or more than one solvent). In another embodiment, the counter electrode coating composition contains from 65 wt-% to 80 wt-% of solvent (one or more than one solvent). In one embodiment, the counter electrode coating composition contains from 10 wt-% to 20 wt-% of alcohol, from 3 wt-% to 15 wt-% of water, and from 40 wt-% to 60 wt-% of glycol ether.

The counter electrode coating composition as discussed above can be used to form the counter electrode using any method known to those of skill in the art, having read this specification. Generally, coating methods that can produce substantially uniform coatings are utilized. Examples of such methods include, but are not limited to, knife coating, screen printing, extrusion coating, gravure coating, reverse gravure coating, and ink jet coating. In one embodiment, screen printing is utilized. Screen printing, gravure coating, and reverse gravure coating can all be advantageous because they can afford the ability to deposit the coating composition in a specific pattern on the substrate.

The desired viscosity of the counter electrode coating composition depends at least in part on the particular coating method that will be used. Where screen printing is utilized, the desired viscosity values are the same as those that were discussed with respect to the working electrode above. The porosity of the counter electrode that is formed also generally is controlled so that facile ionic transport ($Li^+$ ions for example) occurs. In some embodiments, the porosity of the counter electrode can be similar to that discussed above with respect to the working electrode.

Figure 4:
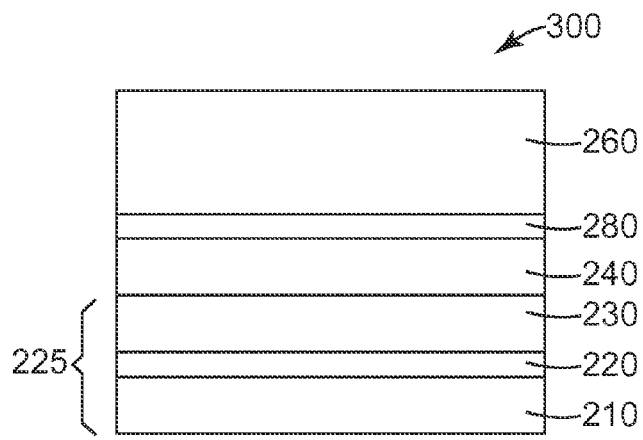
FIG. 4 depicts an exemplary electrochromic device in accordance with an embodiment.

Another embodiment, of an electrochromic device 300 is depicted in FIG. 4, and includes the components discussed above with respect to FIG. 3 and also includes a reflective layer 280. The reflective layer 280 is generally positioned between the working electrode 225 and the counter electrode 260. More specifically, the reflective layer 280 can be positioned on top of the working electrode 225, on top of the counter electrode 260, or on top of both electrodes. The electrolyte layer 240 and the reflective layer 280 overlap somewhat in that the components of the electrolyte layer 240 will migrate into the reflective layer 280. The reflective layer 280 therefore cannot disrupt the ionic transport through the space where it exists. The reflective layer 280 functions to separate the two electrodes, allow the passage of ionic electrolyte and maintain a white background for a reflective display device.

In one embodiment, the reflective layer includes material that is insulating and scatters light. In one embodiment, the reflective layer includes a layer of alumina coated $TiO_2$. In one embodiment, the reflective layer is from 10 μm to 200 μm thick. In yet another embodiment, the reflective layer 280 is from 25 μm to 100 μm thick.

In another embodiment, the reflective layer 280 includes a reflective porous membrane. A reflective porous membrane can generally function to block out the color of the underlying counter electrode. This is often desirable because the counter electrode can be metallic (e.g. gold) or a highly doped and dark colored metal oxide (e.g. antimony doped zinc oxide (AZO) and antimony doped tin oxide (ATO). The reflective porous membrane can function to mask the counter electrode and in some embodiments provide a white background. A layer of alumina coated $TiO_2$ as discussed above can also be utilized to fulfill this function, but can be inflexible, which can lead to shorting and a short lived device.

The reflective porous membrane can also function as a separator between the working electrode 225 and the counter electrode 260. Often, additional gaskets, spacer beads, or membranes are utilized to maintain the gap between the working electrode and the counter electrode. Such structures contribute to durability and flexibility concerns and can require more time consuming manufacturing. A reflective porous membrane can eliminate the need for those additional structures by maintaining the gap between the counter electrode and the working electrode.

A reflective porous membrane can also enhance the mechanical stability of the overall device by providing a mechanically stable layer in place of a gap that is filled with electrolyte.

A reflective porous membrane is generally reflective of light in the visible range. The large variations in the refractive indices of the voids, polymer, and particles within the reflective porous membrane ensure high reflectivity of the membrane even when the membrane is soaked with electrolyte whose index of refraction is close to the polymer. As used herein with respect to the reflective porous membrane, reflective generally means that the membrane has at least 90% reflectance of light from 425 nm to 800 nm in air. In another embodiment, reflective generally means that the membrane has at least 95% reflectance of light from 425 nm to 800 nm in air.

A reflective porous membrane is generally porous. As used herein with respect to the reflective porous membrane, porous generally means that ionic components can be conducted across the reflective porous membrane. In one embodiment, porous, as used with respect to the reflective porous membrane generally means that the mean pore diameter is at least 0.01 µm. In another embodiment, porous means that the mean pore diameter is at least 0.1 µm. In yet another embodiment, porous means that the mean pore diameter is at least 0.2 µm. The porous nature of the reflective porous membrane also allows the reflective porous membrane to absorb liquid electrolyte to minimize leakage of the electrolyte and prevent or minimize contamination from the sealants.

The reflective porous membrane is also generally conformable and flexible. Reflective porous membranes that are conformable and/or flexible may offer an advantage in electrochromic devices that are flexible. In flexible devices having a conformable, flexible reflective porous membrane, bending may not cause a short circuit in the device because the reflective porous membrane will bend with the device, maintaining the gap.

Generally, reflective porous membranes have a thickness from 20 µm to 100 µm. In another embodiment, reflective porous membranes have a thickness from 25 µm to 45 µm. In yet another embodiment, reflective porous membranes have a thickness from 30 µm to 35 µm. In even a further embodiment, a reflective porous membrane has thickness of about 30 µm.

A reflective porous membrane is formed using a solvent induced phase separation (SIPS) process. Generally, SIPS processes are known to those of skill in the art, an exemplary SIPS process and its application can be found in U.S. Pat. No. 6,692,799, the disclosure of which is incorporated herein by reference. Generally, SIPS processes that are used to form the reflective porous membranes utilize a membrane solution that contains a polymer solution, a pore forming solution, and reflective particles. The membrane solution is coated on the substrate, and then the coating is dried by evaporation of solvents. In one embodiment, the membrane solution is dried at temperatures that are amenable to being used with flexible, plastic substrates. As the membrane solution is dried, the solvent in which the polymer is soluble is chosen so that it evaporates before the pore forming solution, causing the polymer to solidify and phase separate from the pore forming solvents, forming the polymer portion of the reflective porous membrane. When the pore forming solution evaporates the pores in the reflective porous membrane are formed because the polymer has already solidified.

The pore size, and pore fraction generally contribute to the ionic mobility through the reflective porous membrane. The ionic mobility and reflectance of the reflective porous membrane can be determined based on the particular solvents used, the amounts of solvents used, the drying time and temperature, and the amount and size of the reflective particles. The way in which the pore size, pore fraction, and reflectance can be modified by changing these (and other) parameters would be within the ordinary level of one of skill in the art, having read this specification.

For example, as the ratio of the pore forming solution to the polymer solution is increased, the pores in the reflective porous membrane should increase in size, and vice versa. Also, as the amount of the reflective particles is increased, the reflectance of the microporous membrane will be increased. One of skill in the art, having read this specification, will also understand that the amounts and identities of the components are bound somewhat by the necessary mechanical properties of the final reflective porous membrane.

As stated above, the SIPS process utilizes a polymer solution. The polymer solution can include one or more than one polymer. In one embodiment at least two polymers are utilized in the polymer solution. The particular polymer(s) that is utilized is generally chosen based at least in part on the mechanical properties and flexibility that are desired in the ultimate reflective porous membrane. In one embodiment, at least one fluorinated thermoplastic polymer is utilized. In one embodiment, a polyvinylidene polymer is utilized. In one embodiment, a copolymer including a polyvinylidene polymer is utilized. In yet another embodiment, a copolymer, polyvinylidene fluoride-co-hexafluoropropylene (PVDF-HFP) is utilized in the polymer solution. Commercially available polyvinylidene fluorides, KYNAR® polyvinylidene fluorides from Arkema, Inc. (Philadelphia, Pa.) may be utilized. In one embodiment, more than one specific Kynar® polyvinylidene fluoride polymer may be utilized.

The polymer solution also includes at least one polymer solvent. The at least one polymer solvent is generally one in which the polymer is soluble. In an embodiment where polyvinylidene fluoride polymers are utilized, acetone or other ketones can be utilized as the polymer solvent. In some embodiments, tetrahydrofuran (THF) or dimethyl carbonate can be utilized as a polymer solvent. Generally, the at least one solvent has a higher vapor pressure than the solvents in the pore forming solution at room temperature and has a low boiling point.

Generally, the polymer solution has from 5 wt-% to 30 wt-% polymer. In another embodiment, the polymer solution has from 5 wt-% to 20 wt-% polymer. In yet another embodiment, there is 10 wt-% of polymer in a polymer solution. One of skill in the art, having read this specification, will understand how both increasing and decreasing the amount of polymer in the polymer solution will affect reflective porous membranes that are formed using such solution.

One of skill in the art, having read this specification, will understand that additional components, not specifically mentioned herein can also be added to the membrane solution in order to obtain desired properties in the reflective porous membrane. Examples of such other components include, but are not limited to the following. In one embodiment, crosslinkable functionalized polyethylene glycol (PEG) oligomers such as polyethylene glycol diacrylate (PEGDA) can optionally be added to a membrane solution. When the pore forming solvents used are more hydrophilic than the polymer solvents PEGDA will reside in the more hydrophilic pore forming solvents. This can help to adjust the porosity of the membrane and once the solution is crosslinked, it will improve the mechanical strength of the membrane. In another embodiment, inorganic additives such as fumed silica (Aerosil200 from Degussa for example) can also be added in the membrane solution to adjust the viscosity of the membrane coating solution and improve the mechanical strength of the membrane and its adhesion to the substrate.

Membrane compositions also include a pore forming solution. The pore forming solution includes at least one solvent in which the polymer is insoluble, referred to herein as a pore forming solvent. As the pore forming solvent evaporates, the space in which it existed in the coating, forms voids in the microporous membrane. The pore forming solvent generally evaporates after the polymer solvent. The pore forming solvent therefore has a lower vapor pressure than the polymer solvent at the same temperature. In one embodiment where the polymer solvent is a ketone, the pore forming solvent is an alcohol, water, or some combination thereof. In one embodiment, the pore forming solvent is a mixture of water and ethanol.

The membrane solution also includes at least one kind of reflective particles. Generally, reflective particles include reflective metal oxides, including, but not limited to titanium dioxide ($TiO_2$), zirconium dioxide ($ZrO_2$), zinc sulfide (ZnS), and alumina ($Al_2O_3$). Some embodiments utilize reflective particles that are white in color. Particular exemplary titanium dioxide particles that can be utilized include, but are not limited to, CR-50-2 commercially available from Ishihara Corporation (USA) (San Francisco, Calif.).

In one embodiment, a membrane composition contains from 60 wt-% to 85 wt-% of the polymer solution. In another embodiment, a membrane composition contains from 70 wt-% to 80 wt-% polymer solution. In yet another embodiment, a membrane composition contains from 74 wt-% to 76 wt-% polymer solution.

In one embodiment, a membrane composition contains from 5 wt-% to 20 wt-% reflective particles. In another embodiment, a membrane composition contains from 5 wt-% to 15 wt-% reflective particles. In yet another embodiment, a membrane composition contains about 10 wt-% reflective particles.

In one embodiment, a membrane composition contains from 5 wt-% to 20 wt-% pore forming solution. In another embodiment, a membrane composition contains from 5 wt-% to 15 wt-% pore forming solution. In yet another embodiment, a membrane composition contains from 10 wt-% to 15 wt-% pore forming solution.

In one embodiment, the SIPS process includes forming the polymer solution, forming the pore forming solution, mixing the polymer solution and pore forming solution together, adding the reflective particles to the polymer/pore forming solution to form the membrane solution, coating an electrode with the membrane composition, and drying the membrane composition to form the reflective porous membrane.

Generally, the mixing of the various solutions can be done using methods known to those of skill in the art. The membrane composition can be coated onto the substrate using methods known to those of skill in the art. Such methods include, but are not limited to, use of a notch bar coater, die coater, gravure coater, reverse gravure coater, spin coater, dip coater, knife coater, roll coater, slide coater, slot coater, curtain coater or an ink jet. In embodiments where a notch bar coater is utilized, notch widths of from 10 mils to 30 mils can be utilized. In other embodiments, notch widths of from 15 mils to 25 mils can be used. In another embodiment, a notch width of 20 mils can be used.

Generally, the drying of the coated electrode can also be carried out using methods known to those of skill in the art. In one embodiment, the coated electrode substrates are dried in air first to evaporate most of the polymer solvent. Then, they can be further dried at elevated temperatures for example, in a convection oven at 80 to 100° C. for 5 to 10 minutes, to remove any residual polymer and pore forming solvents.

Experimental

Materials

Acetone, ethanol, and methanol were obtained from Sigma-Aldrich (St. Louis, Mo.).

P25 $TiO_2$ powder was obtained from Degussa (Dusseldorf, Germany). ST-01 and ST-21 nanopowder were obtained from Ishihara Corporation USA (San Francisco, Calif.).

Modified viologen (1,1'-bis(2-phosphonoethyl)-4,4'-bipyridinium dichloride), was synthesized by adding 4,4'-bipyridine (4.4 g) and diethyl-2-bromoehtyl phosphonate (15.0 g) to water (75 mL), and refluxing the reaction mixture for 72 hours. After the reaction mixture was allowed to cool, concentrated hydrochloric acid (50%, 75 mL) was added and the mixture was refluxed for another 24 hours. The product was recovered by concentrating the reaction mixture to 50 mL, adding 200 mL 2-propanol dropwise, and stirring the mixture, on ice, for an hour, followed by filtering. The white crystalline product was washed with cold 2-propanol and air dried to give the redox chromophore 1,1'-bis(2-phosphonoethyl)-4,4'-bipyridinium dichloride.

METHOCEL E 4M and METHOCEL E 50 were obtained from the Dow Chemical Company (Midland Mich.).

Dow Coming additives 71 and 57 were obtained from Dow Corning Corporation (Midland Mich.).

Ferrocenecarboxylic acid (FC—COOH) was obtained from Sigma-Aldrich (St. Louis, Mo.).

Diethylene glycol monoethylether was obtained from Alfa Aesar (Ward Hill, Mass.).

Indium tin oxide (ITO) coated substrates were obtained from Sheldahl (Northfield, Minn.).

Celnax CX-Z641M (Dispersion of 60 wt % antimony doped zinc oxide 20 nm particles in Methanol) was obtained from Nissan Chemical America Corporation (Houston Tex.).

The AZO paste was prepared by adding the desired amount of the METHOCEL 4M solution (10% Methylcellulose 4M in DI water) and diethylene glycol monoethyl ether solvent into a glass vial/jar containing a magnetic stir bar. The Methocel binder and solvent generally require a minimum of 8 hours stirring at 90-100° C., the contents were therefore stirred overnight (14-18 hours). Next the Celnax CX-Z641M (Dispersion of 60 wt % antimony doped zinc oxide 20 nm particles in Methanol) was added to the mixture. The solution was stirred an additional 7 hours at 90° C. The paste was allowed to cool before screen printing.

Alumina coated $TiO_2$ particles (CR-50-2 from ISK, ~300 nm) was obtained from Ishihara Corporation USA (San Francisco, Calif.).

Kynar® 2801 and Kynar® 2751 was obtained from Arkema, Inc. (Philadelphia, Pa.).

Polyethyleneglycol diacrylate (PEGDA) was obtained from Sigma-Aldrich (St. Louis, Mo.).

EXAMPLE 1

Preparation of a Working Electrode Coating Composition

Dispersed solutions having the amounts of components seen in Table 1 below were prepared as follows: Titanium dioxide nanopowder, ST-01 and ST-21 were premixed using a T 25 ULTRA-TURRAX® Rotor-Stator high-shear mixer (IKA® Works, Inc., Wilmington, N.C.) with aqueous solutions of modified viologen (prepared as given above). The mixture was further dispersed by the use of a microfluidizer® with serial 250 μm and 85 μm interaction chambers (Microfluidics, Newton, Mass.) operated at about 30,000 psi for up to 8 passes. The XRD diameters of the ST-01 and ST-21 are 7 and 20 nm respectively.

TABLE 1

TiO2/viologen aqueous dispersion composition

| | $C_{viologen}$ (mM) | % wt ST-01 | % wt ST-21 |
|---|---|---|---|
| Dispersion 1 | 25 | 0 | 32 |
| Dispersion 2 | 50 | 22 | 0 |
| Dispersion 3 | 50 | 20 | 2 |

The dispersed solutions, Dispersion 1, 2, and 3, were then utilized to form coating compositions. The main formulation compositions (%wt) are listed in table 2 below. The METHO-CEL used in the formulations as the organic binder was METHOCEL E4M. Water is the main solvent in the formulations (the amount being the remaining percent not listed in the table). Small amounts of 1 M $NH_4OH$ were added to formulations B, C and D to lower the pH values of the coating compositions. From 0.1 to 0.5 wt-% of Dow Corning additives 71 and 57 were also used in the formulations to improve the wetting and spreadability of the formulations. In formulation D, ferrocenecarboxylic acid (FC—COOH) was added. Diethylene glycol monoethylether is used as the co-solvent because it has a low vapor pressure at room temperature in the formulations.

TABLE 2

Main compositions of printable coating composition formulations.
Dispersions 1, 2 and 3 are described in Table 1

| | $TiO_2$ dispersion | wt-% TiO2 | wt-% MCE4M | wt-% DEGME | wt-% LiClO4 | wt-% FC-COOH |
|---|---|---|---|---|---|---|
| Formulation A | 1 | 14.5% | 1.5% | 39.5% | 0.1% | 0% |
| Formulation B | 2 | 10.6% | 1.0% | 39.2% | 0.1% | 0% |
| Formulation C | 3 | 12.1% | 1.0% | 39.2% | 0.1% | 0% |
| Formulation D | 2 | 10.6% | 1.0% | 39.2% | 0.1% | 0.05% |

EXAMPLE 2

Formation of Films

1"1" films of formulations A, B, C, and D were printed onto ITO glass substrates (50Ω/□) by screen printing using polyester of stainless mesh, mesh size selected for the desired film thickness. The printed wet film was dried at 80° C. for 5 min. The dried film thickness was about 5 µm. The dried film was then soaked in methanol at 40° C. for 5 min. After air drying, the rinsed film was finally dried at 80° C. for 5 min. This film was used as the working electrode (W.E.) in the device and was characterized in Example 3 below.

EXAMPLE 3

Characterization of $TiO_2$ Films

Experiments were carried out to determine the interfacial area of the low temperature $TiO_2$ electrode films formed in Example 2 above. Nitrogen ($N_2$) adsorption/desorption experiments were carried out. A sintered electrode was prepared for comparison. A coating composition that contains a large amount (binder:$TiO_2$=0.45) of organic binder (including poly(ethylene glycol) (40 wt-%) and METHOCEL E 50 (methocellulose ether)(10 wt-%) was prepared. The sintering temperature was 450 C.°, which was high enough to burn the binder completely and fuse the neighboring $TiO_2$ particles together. The coating composition for the sintered $TiO_2$ film utilized $TiO_2$ colloidal dispersion STS-01 from ISK. The particles in STS-01 dispersion have the same average size as in ST-01 powder (7 nm).

A low temperature electrode film formed from Formulation B in Example 2 and a sintered electrode made as discussed above were scraped off from their substrates. The powder samples were then used in $N_2$ adsorption/desorption experiments. To obtain specific surface area information of the materials from the two films, a TriStar 3000 gas adsorption analyzer from Micromeritics (Norcross, Ga.) was used. The $N_2$ adsorption/desorption results of powder from both the sintered and Formulation B coating composition are shown in table 3. It is evident from table 3 that the particles are more closely fused together in the sintered $TiO_2$ film, leading to a lower surface area (BET surface area in Table 3). But in the sintered film, the average pore size is larger than in the low temperature processed film, leading to a porous framework that is more accessible by ionic electrolytes. The fusion of particles in the sintered $TiO_2$ film is also revealed by X-ray diffraction (XRD) measurement and the calculation of apparent crystal size by the use of the Scherer equation. It is found that in the sintered film, the XRD crystal size is about 12.5 nm comparing to 6.5 nm in the Formulation B film.

TABLE 3

$N_2$ adsorption/desorption results of $TiO_2$ powder from films prepared under different conditions.

| N2 Gas Adsorb/Desorb Results | Sintered $TiO_2$ Film (450° C.) | 80° C. $TiO_2$ Film from Formulation B |
|---|---|---|
| BET Surface Area (m²/g) | 59.4 | 134.0 |
| Single Point Des. Pore Vol. (cm³/g) | 0.376 | 0.742 |
| BJH Des. Ave. Pore Diameter (nm) | 21.4 | 16.5 |

EXAMPLE 4

Electrical and Visual Performance of Electrochromic Device

Electrochromic devices including the working electrodes prepared in Example 2 were further prepared as follows. The counter electrode (C.E.) was formed by screen printing an AZO paste (prepared as above). The film was about 7 µm and was dried at 80° C. On top of the AZO film a white reflector layer of alumina coated $TiO_2$ particles (CR-50-2 from ISK, ~300 nm) was deposited by screen printing. A UV curing sealant was dispersed along the edge of the electrode leaving two open filling holes. The UV sealant was formulated in accordance with U.S. patent application Ser. No. 11/423,191, entitled "BONDING METHOD WITH FLOWABLE ADHESIVE COMPOSITION", filed on Jun. 9, 2006, the disclosure of which is incorporated herein by reference. Glass beads of 75 μm were used as the spacer beads between the working and counter electrodes. A UV curable electrolyte, which is described in detail in a US Patent Application, filed on the same day as this application, entitled "CURABLE ELECTROLYTE", Ser. No. 11/566,509 was subsequently backfilled into the assembled device by capillary force. The filling holes were then finally sealed with the 3M UV curable sealant described above.

Figure 5:
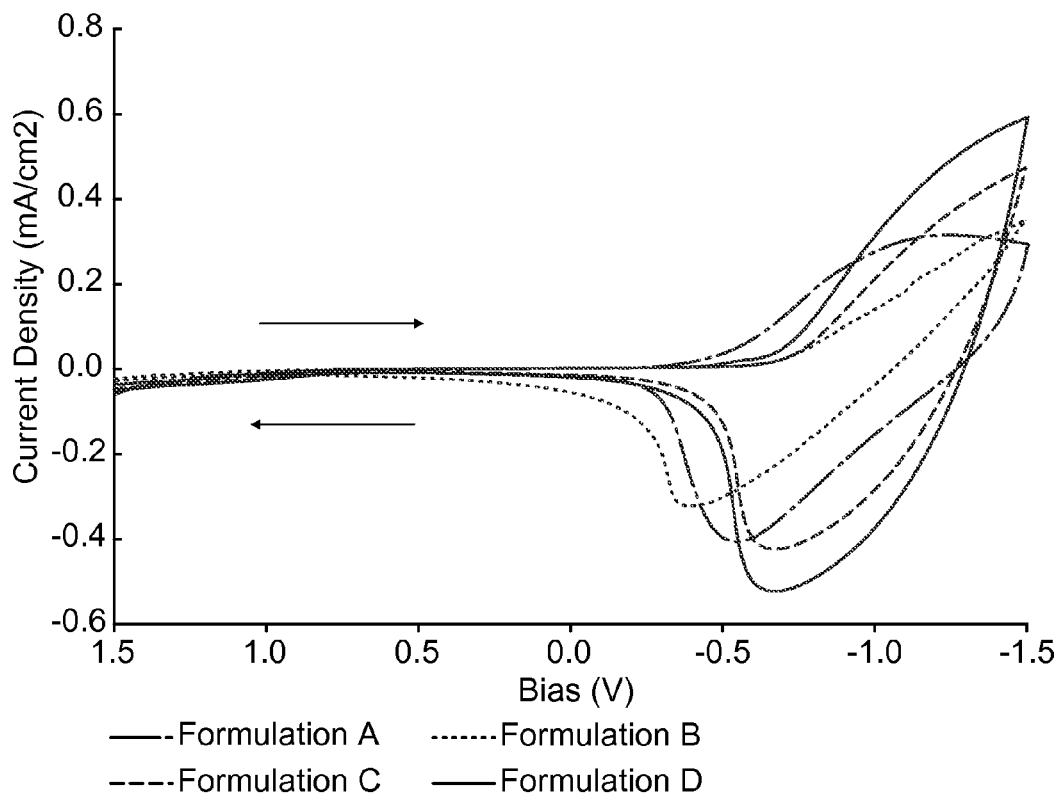
FIG. 5 shows cyclic voltammograms of electrochromic devices with working electrodes made from different $TiO_2$ printable coating composition formulations. The scan rate was 100 mV/sec.

The devices prepared above were electrochemically characterized by recording cyclic voltammograms (CV). The cyclic voltammograms of the devices are shown in FIG. 5. The working electrode was biased against the counter electrode during operation.

Figure 6:
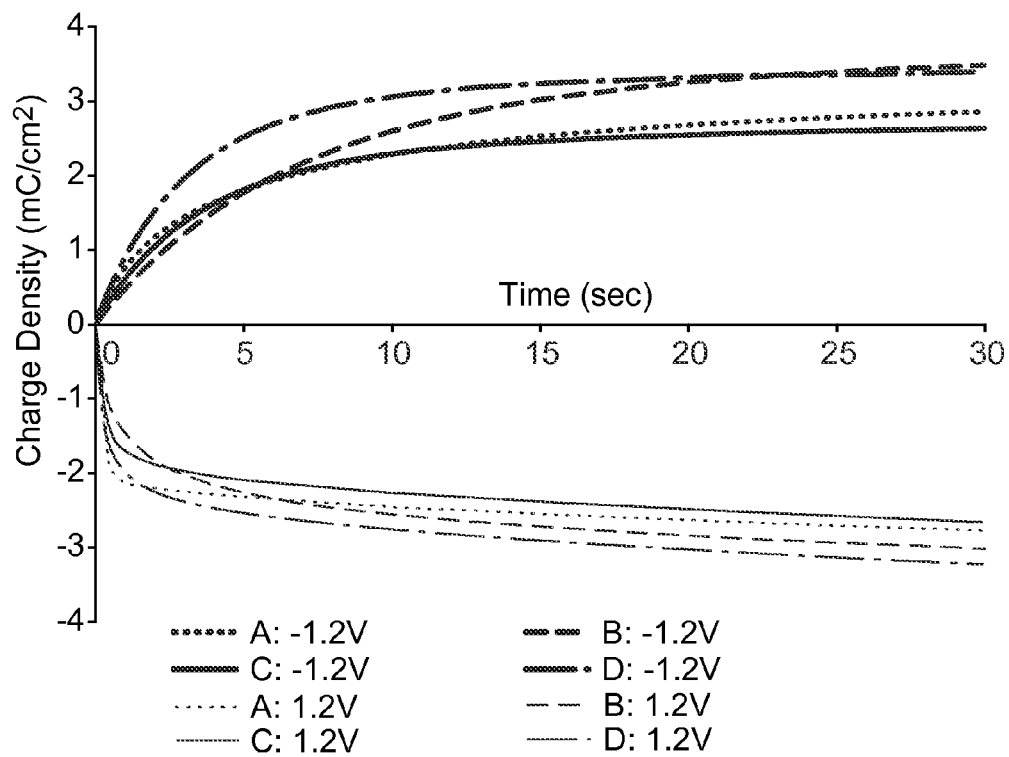
FIG. 6 shows chronocoulometry (CC) data of electrochromic devices with working electrodes made from different $TiO_2$ printable coating composition formulations.

Two step chronocoulometry (CC) was also performed on the devices. FIG. 6 shows the results of those tests. In the first step the device was biased at 1.2V or −1.2V for 20 sec before the application of −1.2V or 1.2V in the second step.

Figure 7A:
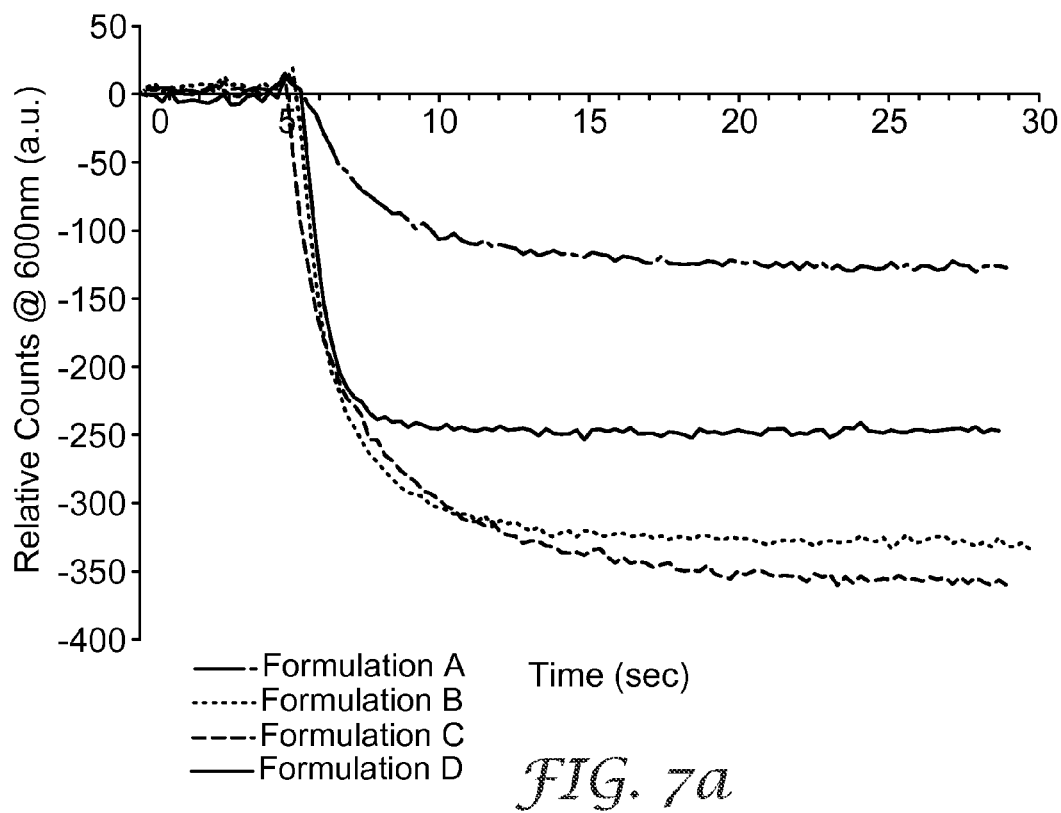
FIG. 7 shows reflected light intensity at 600 nm versus time for step 1, 1.5V, and step 2 –1.5 V (FIG. 7a); and step 1, –1.5V, and step 2, 1.5 V (FIG. 7b) of electrochromic devices made from different $TiO_2$ printable coating composition formulations.
Figure 7B:
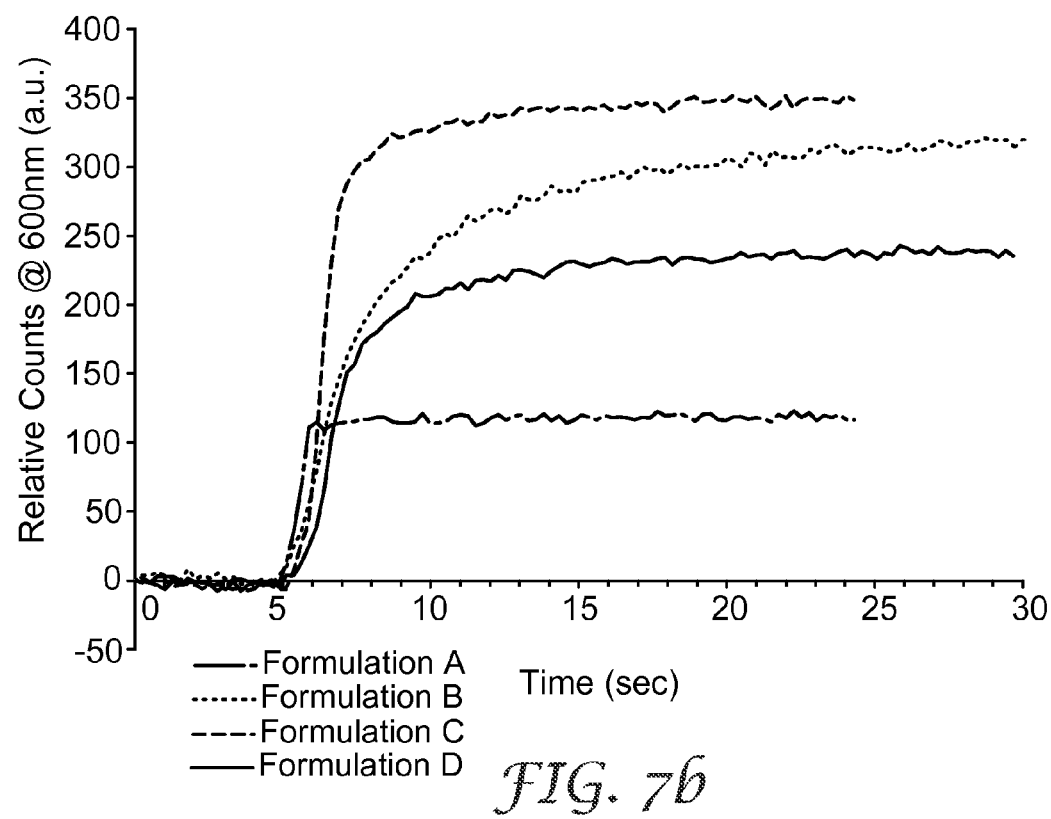

Reflectance measurements were performed on the devices. FIG. 7 shows the results of those tests. FIG. 7 shows the reflected light intensity at 600 nm vs. time for step 1, 1.5V; step 2, −1.5V (FIG. 7a, coloring) and for step 1, −1.5V; step 2, 1.5V (FIG. 7b, bleaching).

EXAMPLE 5

Formation of Flexible Electrochromic Devices

As disclosed above in Example 1, a shear mixer, and microfluidizer® were used to form a $TiO_2$ dispersion. The series of dispersions that were made is given in table 4 below. The solutions used to disperse the nanoparticles contained 50 mM of modified viologen in all the dispersions.

The dispersions were then formed into screen printable coating composition as shown in Example 1 above.

TABLE 4

Dispersion compositions used in the coating compositions below.

| | % wt ST-01 | % wt P25 | ST-01:P25 |
|---|---|---|---|
| Dispersion 1 | 30 | 0 | NA |
| Dispersion 2 | 27.3 | 2.73 | 10:1 |
| Dispersion 3 | 26.7 | 3.33 | 8:1 |
| Dispersion 4 | 25 | 5 | 5:1 |
| Dispersion 5 | 0 | 30 | 0 |

1"×1" films of Dispersions 1, 2, 3, 4, and 5 were printed onto an ITO/PET flexible substrate (100Ω/□) by screen printing. The printed wet film was dried in a convection oven at 80° C. for 5 minutes. The dried film thickness was about 5-7 μm. The dried film was then soaked in methanol at 40° C. for 5 minutes under gentle shaking. After air drying, the rinsed film was finally dried at 80° C. for another 5 minutes. This was used as the working electrode in the device.

The counter electrode was formed by screen printing on the same type of ITO/PET flexible substrate with an AZO paste (prepared as discussed above). The film thickness was about 7-9 μm after drying at 80° C. for 5 minutes. On top of the AZO film a white reflective layer consisting of alumina coated $TiO_2$ particles (CR-50-2 from ISK, ~300 nm) was deposited by screen printing and dried at 80° C. for another 10 minutes. The formulations of the reflective paste contained about 3 wt-% METHOCEL E50, 33 wt-% CR-50-2 particles, and the remainder as solvent (about 1:1 diethylene glycol monoethyl ether and 1-methyl-2-pyrrolidinone). The counter electrode and reflective layer, coated with UV curable electrolyte were formed and the device was finished as in Example 4, above with the exception that the substrate was an ITO/PET flexible substrate. After UV curing the electrolyte the device was edge sealed between two thin PET films using UV curable polyurethane adhesive Ultra Light-Weld obtained from Dymax Corporation (Torrington, Conn.).

EXAMPLE 6

Visual Performance of Flexible Electrochromic Devices

Figure 8:
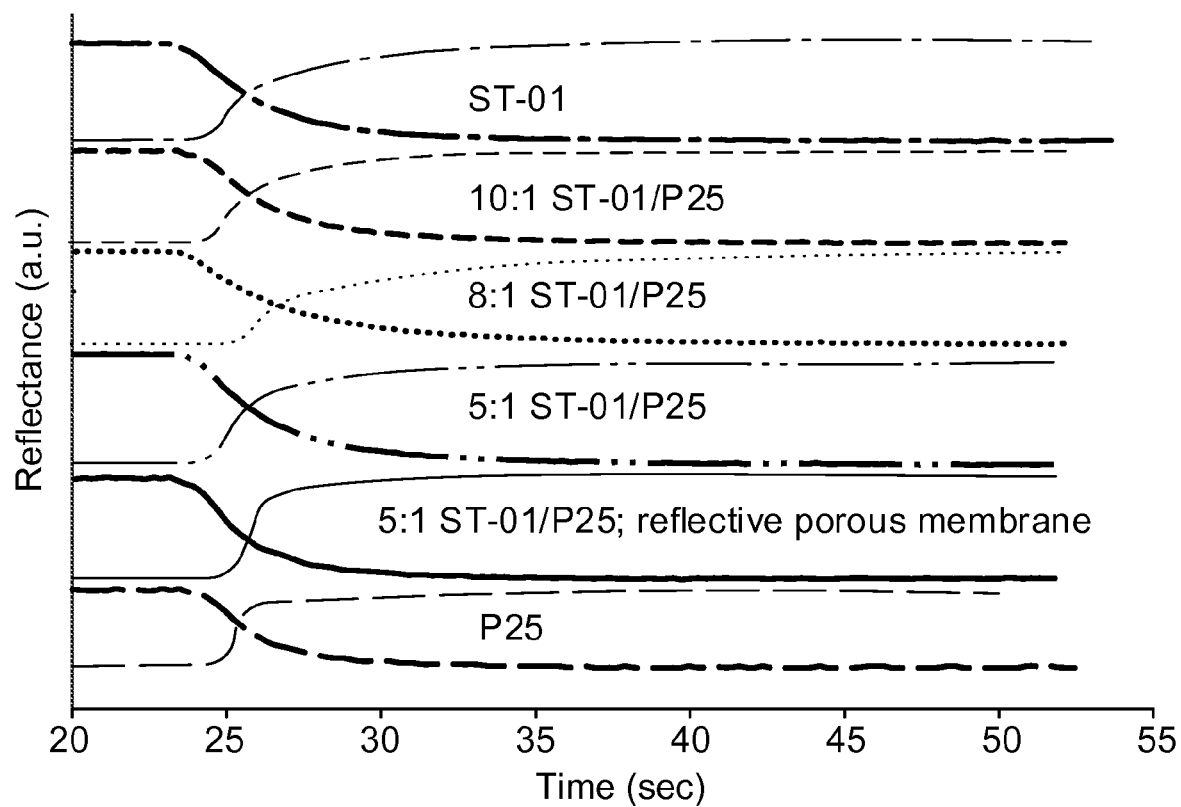
FIG. 8 shows time resolved reflectance (at 600 nm) of the flexible ECDs.

The switching speed of the ECDs made in Example 5 was monitored by time resolved reflectance measurements. The results are shown in FIG. 8. During the measurement the ECD was first held at 1.5 or −1.5V for about 24 seconds then the bias was changed to −1.5 or 1.5V by a step change in the bias and held for about another 30 seconds. The reflected intensity at 600 nm was monitored as a function of time.

Figure 9:
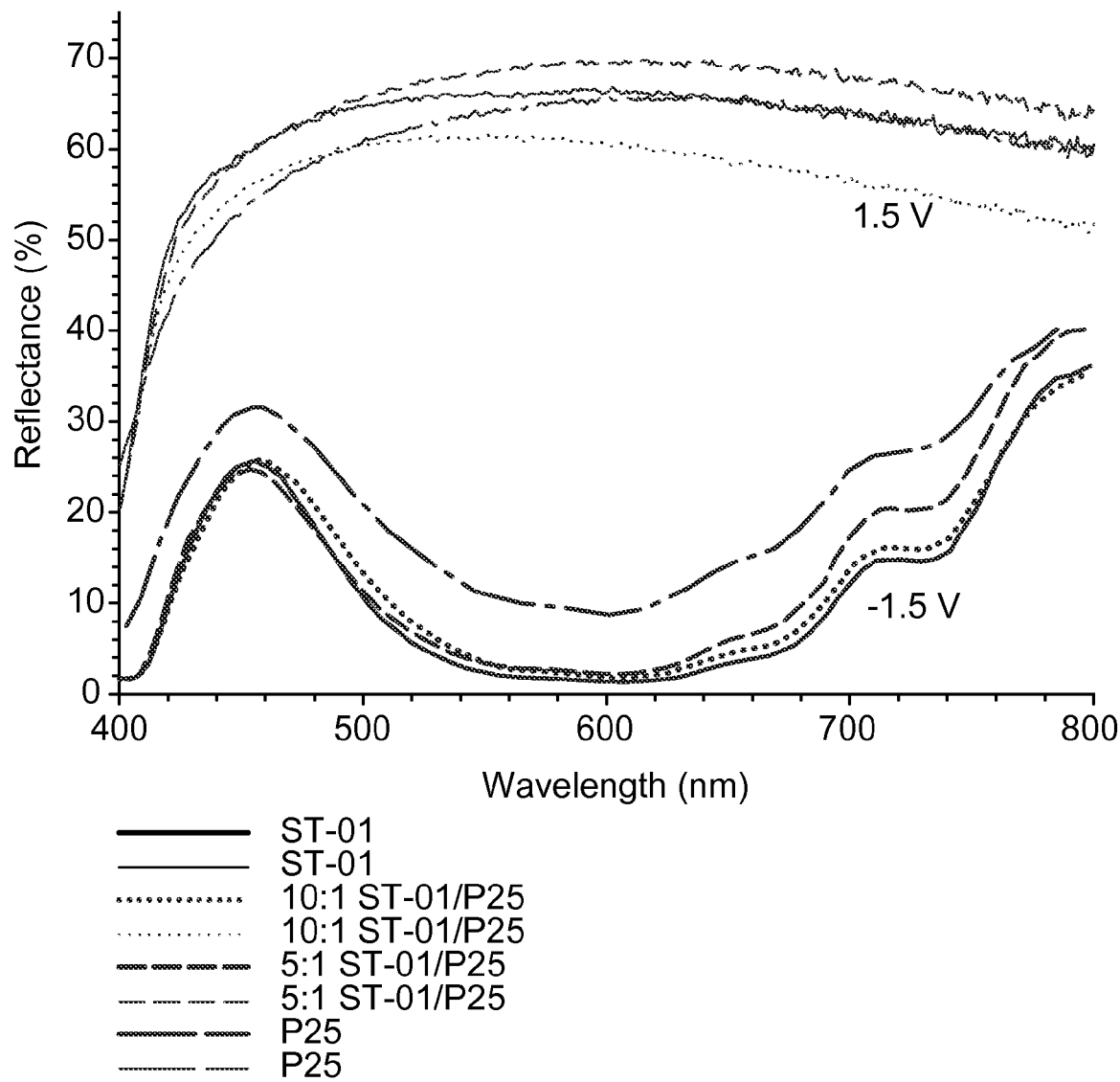
FIG. 9 shows reflectance spectra of flexible electrochromic devices in colored (–1.5 V) and bleached states (1.5V).

Reflectance spectra of the flexible ECDs made in Example 5 were also recorded. A LabSphere reflectance standard was used as the white reference in the measurement using a Lambda 900 UV-Vis spectrometer from PerkinElmer (Wellesley, Mass.). The spectra, which can be seen in FIG. 9, were recorded in the colored state (−1.5 V) and in the bleached states (1.5V). The variation in the reflectance of the bleached state is likely due to variation in the thickness of the white reflective layer in the various devices. The reflectance values at 600 nm of the devices are listed in table 5 below.

TABLE 5

Reflectance data (600 nm) of ECDs in bleached and colored states.

| ST-01:P25 | % ref of bleached state | % ref of colored state | Contrast ratio |
|---|---|---|---|
| ST-01 only | 66.2 | 1.25 | 53 |
| 10:1 | 60.5 | 1.78 | 34 |
| 8:1 | 65.4 | 3.16 | 21 |
| 5:1 | 69.6 | 2.16 | 32 |
| P25 only | 65.5 | 8.68 | 8 |

The contrast ratio in the above table was calculated by taking the ratio between the reflectance values at 600 nm of the bleached state (1.5 V) and colored state (−1.5 V). Another way to estimate the contrast ratio is to multiply the reflectance data in FIG. 9 with the human photoptic response curve and integrate the resulted curve. For example, for the device using 5:1 ST-01/P25 titania mixture, the contrast ratio calculated in this way is as high as 14.

EXAMPLE 7

Formation and Characterization of Reflective Porous Membranes

Reflective porous membranes were formed by making a polymer solution of PVdF-HFP copolymer by dissolving 5% wt Kynar 2801 and 5% wt Kynar 2751 in acetone. Next, a 1:1 (by weight) solution of ethanol and water as the pore forming solution was made. Occasional heating and agitation was used to obtain a completely clear solution. Next, the CR-50-2 reflective particles were added to the clear solution. The mixture was shear mixed to form a homogeneous coating solution. An exemplary coating solution composition is given in table 6 below. The solution was then coated on the working electrodes and the counter electrodes using notch bar coaters with notch widths of 15, 20 and 25 mils respectively. The coated electrode substrates were dried in air in order to evaporate most of the polymer solvent.

TABLE 6

Composition of membrane coating solution

| Weight of polymer solution added (g) | Weight of CR-50-2 TiO$_2$ added (g) | Weight of pore forming solution added (g) | Weight of acetone added (g) |
|---|---|---|---|
| 15 | 2.5 | 3.21 | 3.21 |

The permeation pore size was investigated with a PMI (Porous Materials, Inc. Ithaca, N.Y.) Perm Porometer (model APP-1200-AEX). The membrane thicknesses were measured by an instrument from Testing Machines, Inc. (Amityville, N.Y.) (model 49-70-01-0001). The measured results are shown in table 7 below.

TABLE 7

Porosity and thickness of membranes coated with notch bars with different gap sizes using the coating solution of Table 6.

| Notch bar gap (mil) | Dry film thickness (mil) | Mean flow pore diameter (μm) | Largest detected pore diameter (μm) | Bubble point pressure (PSI) |
|---|---|---|---|---|
| 15 | 1.4 | 0.235 | 0.41 | 15.8 |
| 20 | 1.8 | 0.13 | 0.21 | 31.2 |
| 25 | 2.2 | 0.096 | 0.16 | 41.7 |

Figure 10:
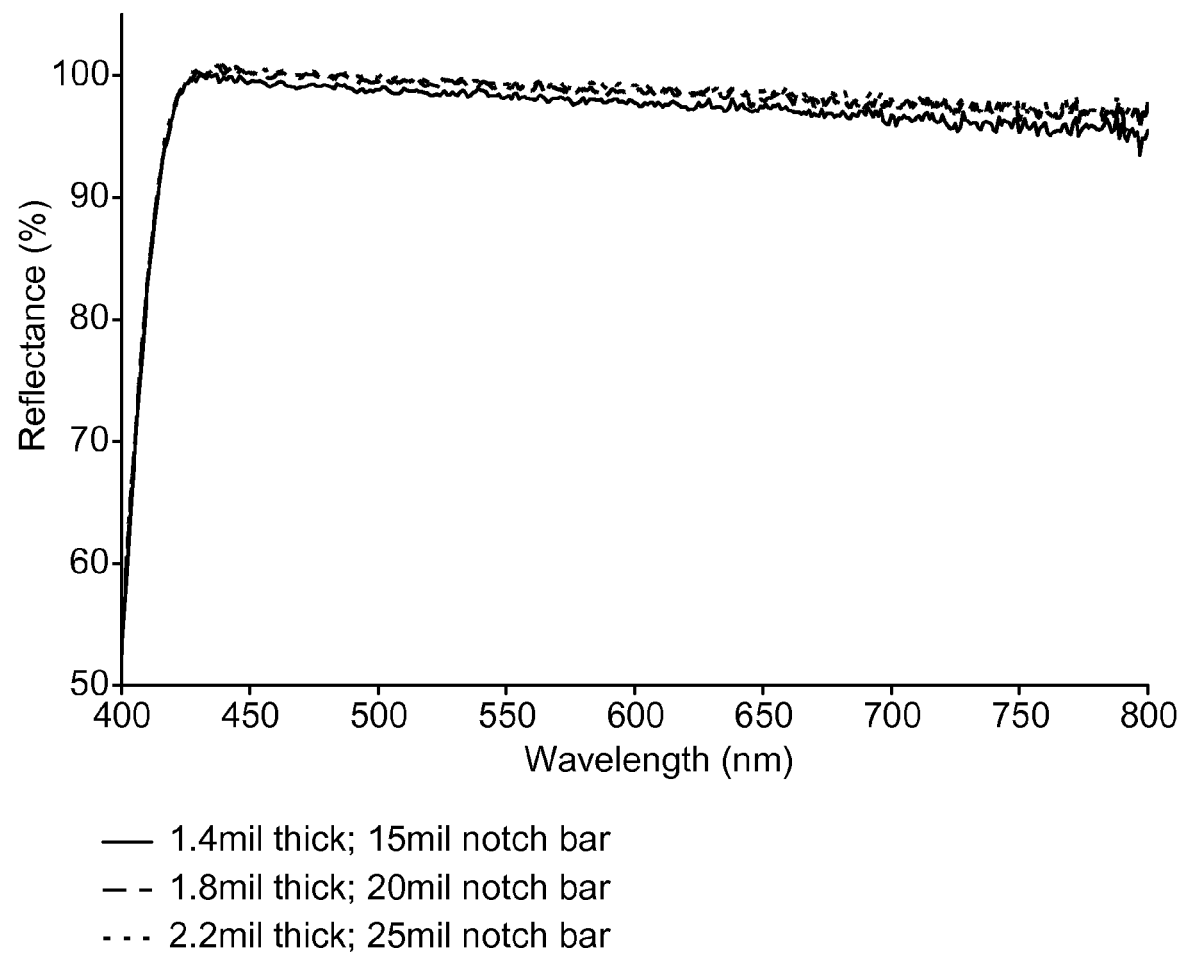
FIG. 10 shows reflectance spectra of microporous membranes of different thicknesses.

The reflectance spectra of the three membranes in Table 7 are shown in FIG. 10. It can be seen that for both 1.8 and 2.2 mils thick membranes the reflectance was greater than 95% in the visible range and there is little difference between the two while the 1.4 mils thick membrane had slightly lower reflectance in air, albeit the reflectance is greater than 95% for most of the visible range.

Figure 11A:
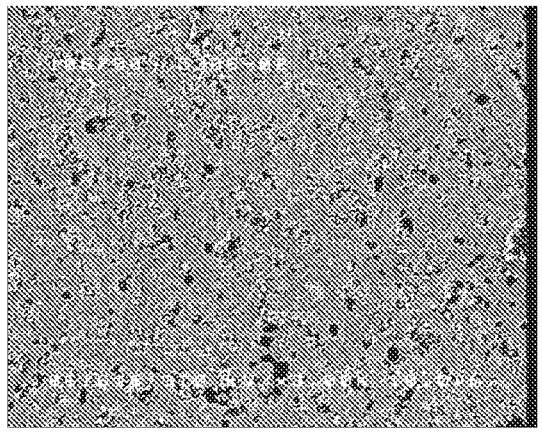
FIG. 11 shows SEM images of microporous membranes, with FIG. 11a showing the top surface.
FIG. 11b showing the cross section.
Figure 11B:
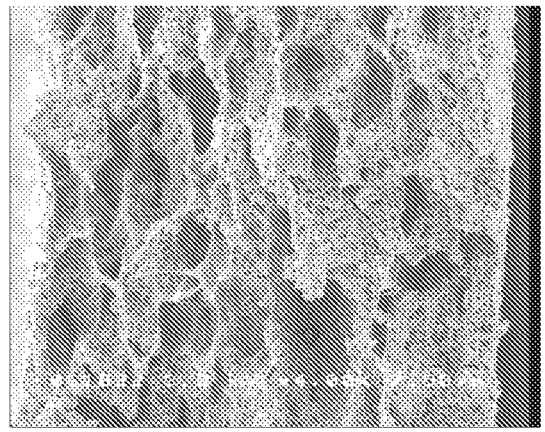

The microstructure of the microporous membrane coated with a 15 mil notch bar was further studied by scanning electron microscope (SEM). The images are shown in FIG. 11a and 11b. The three phases in the membrane, air, polymer, and titania particles, can be clearly seen. It can also be seen, that the surface of the membrane has a high density of pore openings in micron size. The inside of the membrane also consists of micron sized voids with walls packed by titania nanoparticles which are connected by the polymer.

EXAMPLE 8

Amount of Pore Forming Solution in the Reflective Membrane Coating Solution

To study the effect of the amount (wt-%) of pore forming solution (1:1 ethanol:water) on the morphology of a membrane, membranes were made from the following compositions and were studied.

TABLE 8

Compositions of membrane coating solutions with different wt % of pore forming solution.

| Sample ID | Weight of polymer solution added (g) | Weight of CR-50-2 TiO$_2$ added (g) | Weight of pore forming solution added (g) | Weight of acetone added (g) |
|---|---|---|---|---|
| A | 15 | 1.5 | 3.21 | 3.21 |
| B | 15 | 1.5 | 2.21 | 4.21 |

Figure 12A:
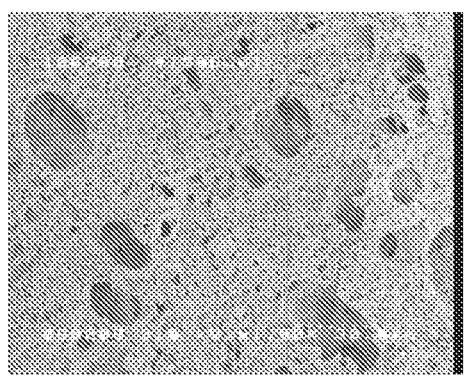
FIG. 12 shows SEM images of the microporous membranes of Example 8 with FIG. 12a showing the top surface of a membrane made from sample A in Table 8, and FIG. 12b showing the top surface of a membrane made from sample B in Table 8.
Figure 12B:
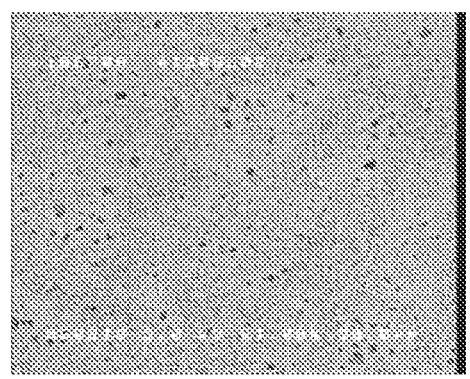
Figure 13A:
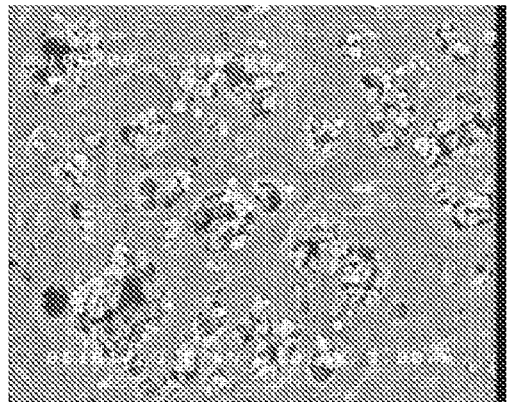
FIG. 13 shows SEM images of the microporous membranes of Example 9 with FIG. 13a showing the top surface of a membrane made from sample C in Table 9, FIG. 13b showing the top surface of a membrane made from sample D in Table 9, FIG. 13c showing the cross section of the membrane from FIG. 13a, and FIG. 13d showing the cross section of the membrane from FIG. 13b.
Figure 13B:
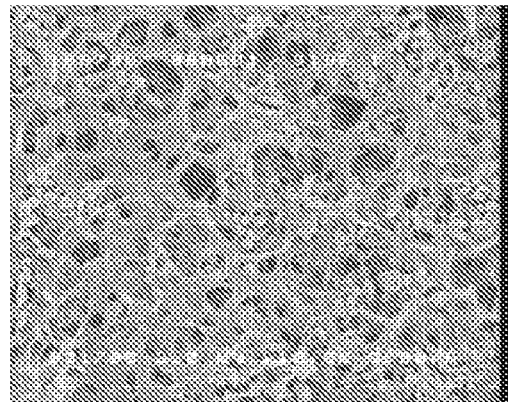
Figure 13C:
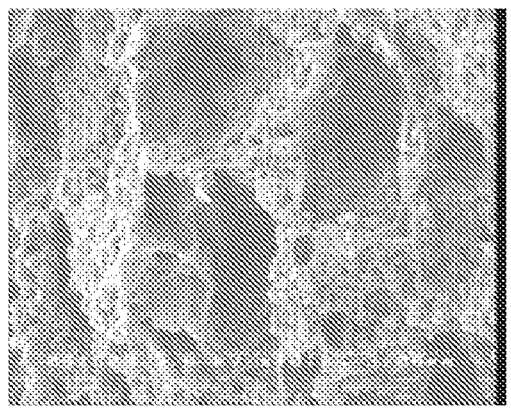
Figure 13D:
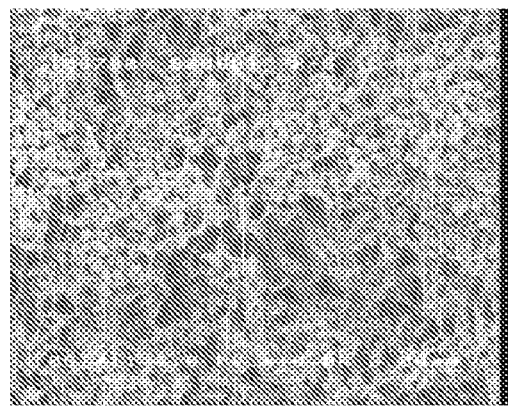

As the wt-% of pore forming solution increased, the pore size in the membrane increased. There was also less skin (a thin layer of polymer film at the surface of the membrane) formation in A than in B. SEM images of the membranes were taken and can be seen in FIGS. 12a and 12b.

EXAMPLE 9

Effect of Additional Additives on the Membrane Morphology

Polyethyleneglycol diacrylate (PEGDA, typical $M_n$=575) is added to a membrane coating solution. The compositions of the coating solutions are listed in Table 9.

TABLE 9

Compositions of membrane coating solutions with and without the addition of PEGDA.

| Sample ID | Weight of polymer solution added (g) | Weight of CR-50-2 TiO$_2$ added (g) | Weight of pore forming solution added (g) | Weight of acetone added (g) | Weight of PEGDA added (g) | Mean Flow Pore Size (μm) |
|---|---|---|---|---|---|---|
| C | 15 | 2.5 | 3.21 | 3.21 | 0 | 0.13 |
| D | 15 | 2.5 | 3.21 | 3.21 | 0.15 | 0.09 |

SEM images of the films were then recorded and can be seen in FIGS. 13a, 13b, 13c, and 13d. By incorporating a small amount of PEGDA in the more hydrophilic pore forming solution, which will remain in the pores after drying the membrane, the surface of the membrane has a more open structure (image a vs. b in FIG. 13). The internal structures of the membranes also vary greatly, albeit, the mean flow pore sizes in both membranes are comparable.

EXAMPLE 10

Formation and Characterization of Electrochromic Devices Including Reflective Porous Membranes Two electrochromic devices, one that included a reflective layer having an organic binder and reflective particles and one that includes a reflective porous membrane were fabricated and characterized.

A TiO$_2$ paste that contains 5:1 by weight ST-01 (7 nm)/P25 (21 nm) paste, prepared in accordance with Example 1, was used to print the working electrode. The TiO$_2$ working electrode film is about 5 μm thick. A paste containing antimony doped zinc oxide (AZO) was used to print the counter electrode, in accordance with Example 4. The counter electrode was about 8-10 μm thick. A UV curable electrolyte was used as the ionic conductive medium between the two electrodes.

On top of one of the AZO counter electrodes, a white reflective layer was printed. The reflective paste consisted of CR-50-2, methylcellulose, 1-methyl-2-pyrrolidinone and diethylene glycol monoethyl ether as the solvents. The paste was screen printed onto the counter electrodes. After drying at 80° C. for 10 minutes, the reflective layer was about 15 μm in thickness. Glass spacer beads with diameters of 45 μm were used to maintain the gap between the working and counter electrodes. This device is referred to herein as device A.

On top of the other AZO counter electrode, the coating solution given in Table 6 above, was coated by a notch bar coater with a gap of 20 mils to form a reflective porous membrane. This device is referred to herein as device B. In this device, the gap was maintained by the membrane with a thickness of about 30 μm. In both devices, ITO/PET substrates with surface resistivity of 100 ohms/sq and thickness of 5 mils were used.

Figure 14A:
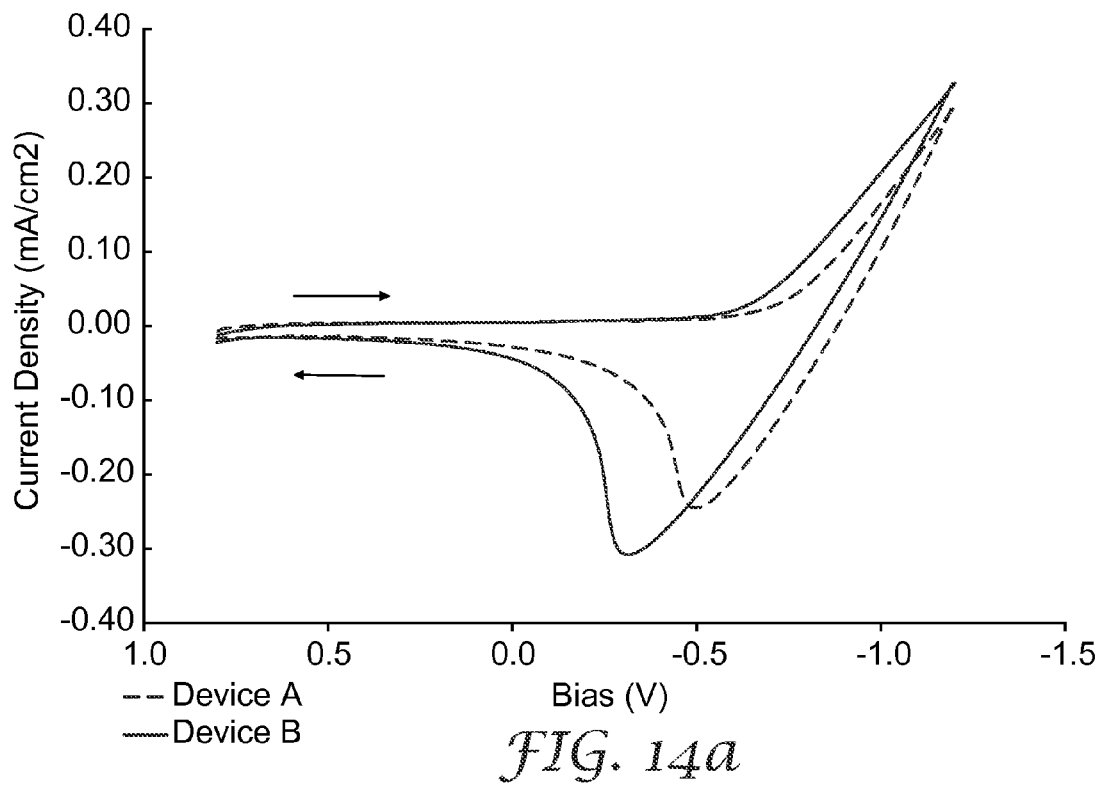
FIG. 14 shows cyclic voltammetry (CV) and chronoamperometry (CA) for devices A and B of example 10.
Figure 14B:
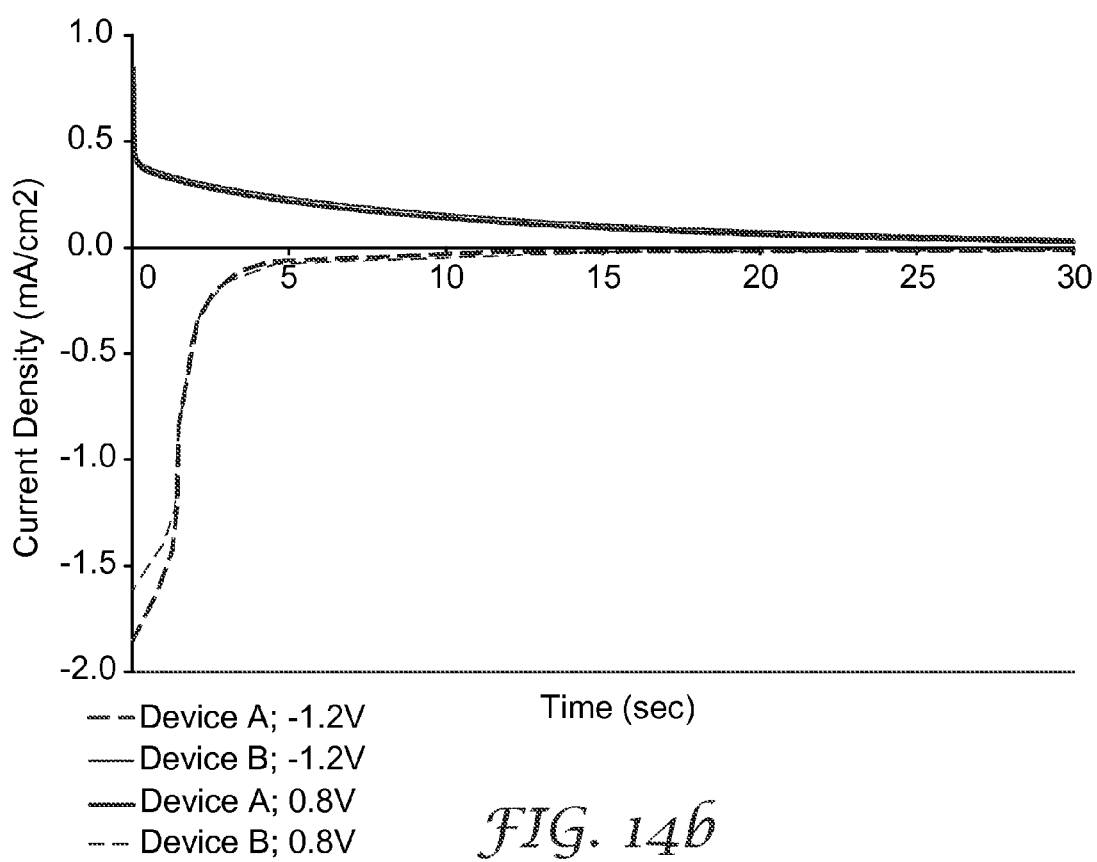

The electrical properties of devices A and B were characterized by cyclic voltammetry (CV) and chronoamperometry (CA). The results are shown in FIG. 14 below. FIG. 14a shows the CV data taken at a scan rate of 200 mV/sec, with the arrows indicating the scan direction, and the bias was applied on the $TiO_2$ working electrode vs. the AZO counter electrode. FIG. 14b shows the CA data, which was a two-step measurement; before which the application of −1.2V, 0.8V was applied for 30 seconds to bleach the devices, and vice versa. It can be seen that both devices behave similarly electrochemically.

Figure 15:
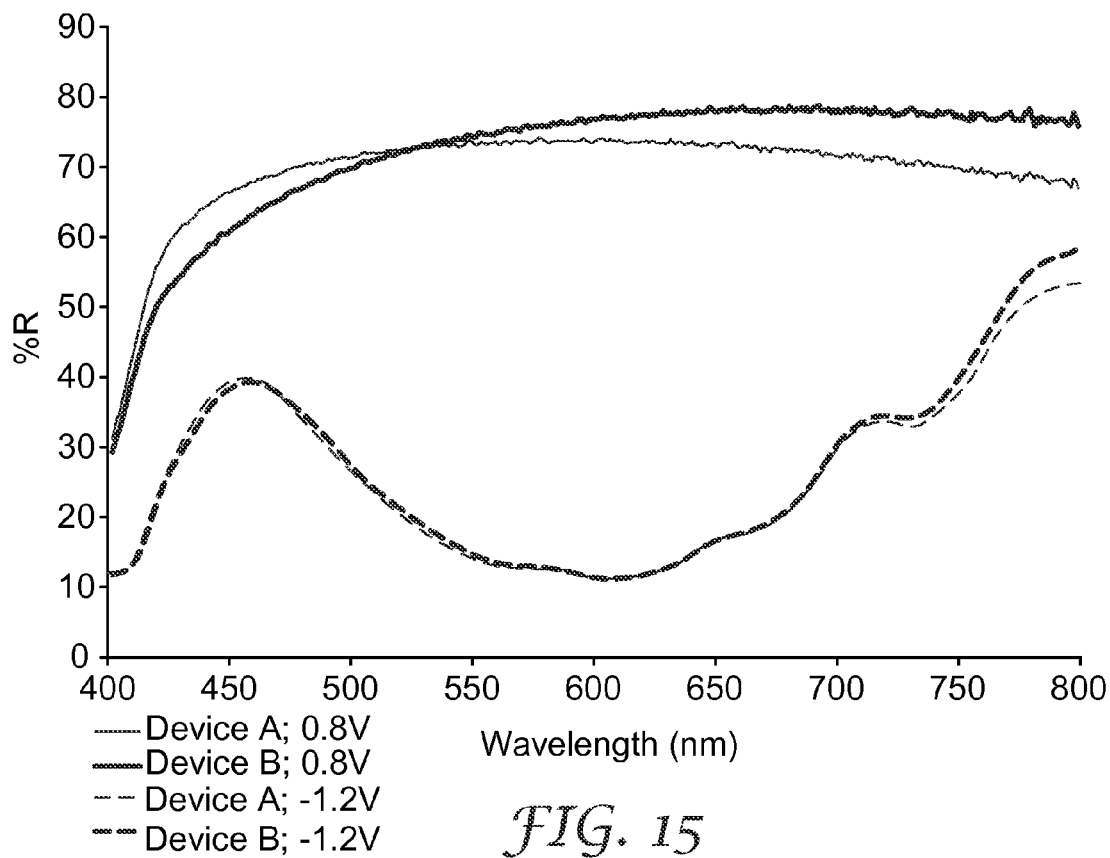
FIG. 15 Reflectance spectra of ECDs of Example 10 at colored (–1.2V) and bleached (0.8V) states.

The total reflectance spectra of the devices under different biases (−1.2 and 0.8V) were studied with a Lambda 900 UV-VIS spectrometer equipped with an integrating sphere. The results are shown in FIG. 15. No special treatment such as AR coating was applied to the substrates surface. Before making the measurements, the bias was applied for 20 seconds. In the bleached state at 0.8V device A has a reflectance of 73.8% and device B has a reflectance of 76.9% at 600 nm. In the colored state at −1.2V both devices show similar reflectance of about 11.4% at 600 nm. This provides contrast ratios of about 6.5 and 6.7 for device A and B respectively at 600 nm.

Figure 16:
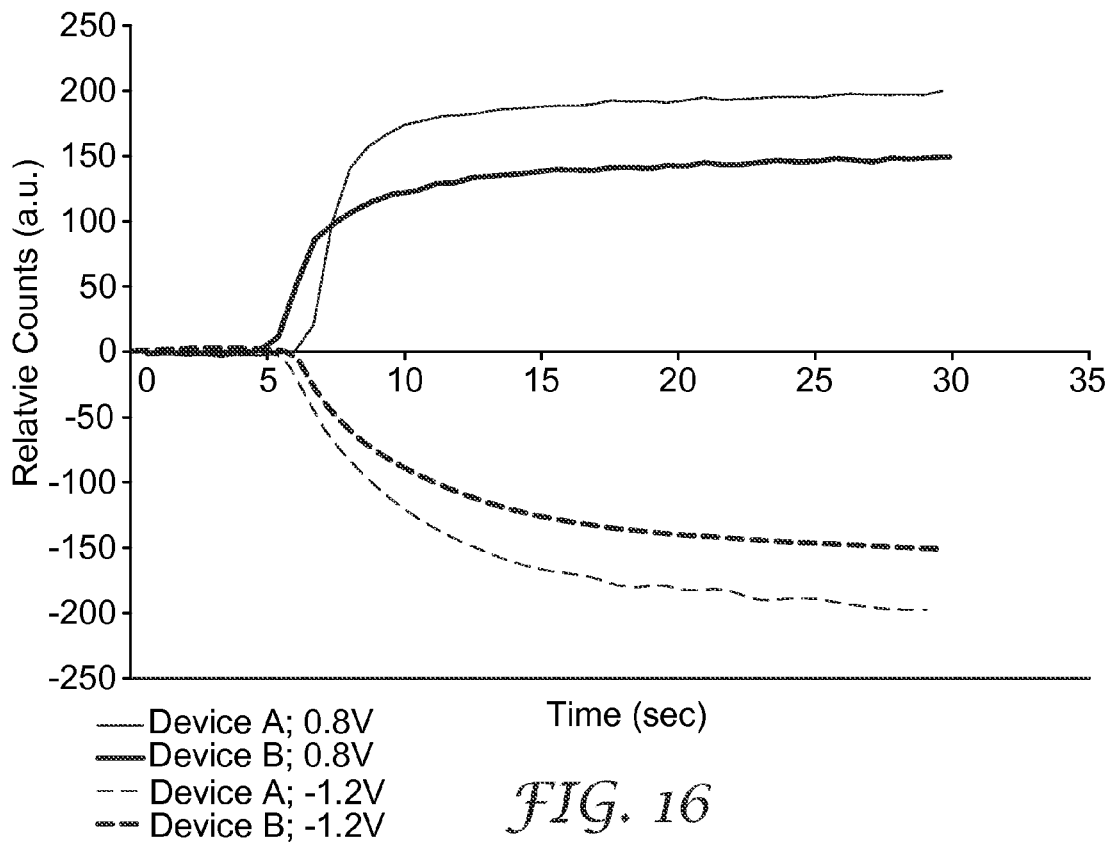
FIG. 16 shows time resolved reflectance data of the electrochromic devices of example 10.

The switching performance of the devices was further studied by time resolved reflectance measurement. An Ocean Optics (Dunedin, Fla.) reflectance fiber probe and spectrometer were used in the measurements. FIG. 16 shows the result of applying a bias of −1.2 V for 30 sec before the application of 0.8 V for another 30 sec and vice versa. The reflected light intensity in a 180° configuration was used and the light intensity at 600 nm was monitored during the measurement. Because of the variation in the diffusivity of the reflective microporous membrane and the particle reflective layer, the magnitude of the spectrometer output could not be used to assess the intensity of the color, but it was instead used to study the switching performance of the devices. Both devices switch similarly. Both devices reached 50% of the maximum colored or bleached state within 5 seconds.

What is claimed is:
1. An electrochromic article comprising:
a working electrode comprising:
a substrate having a first and a second surface;
a conductive layer;
an electroactive layer comprising:
nanoparticles having two different average diameters, both average diameters being from 5 nm to 30 nm; and
at least one electroactive chemical, wherein the electroactive chemical binds to the surface of the nanoparticles; and
at least one organic binder material,
wherein the conductive layer is disposed on the second surface of the substrate, and the electroactive layer is disposed on the conductive layer;
an electrolyte layer disposed on the working electrode;
a release layer disposed on the electrolyte layer; and
a reflective layer disposed below the release layer, wherein the reflective layer is a flexible reflective porous membrane.
2. The electrochromic article according to claim 1, wherein the reflective porous membrane comprises at least one polymer, and at least one reflective particle.
3. The electrochromic article according to claim 1, wherein the reflective porous membrane is from 20 μm to 100 μm thick.
4. An electrochromic device comprising:
a) a working electrode comprising:
a substrate having a first and a second surface;
a conductive layer;
an electroactive layer comprising:
nanoparticles having two different average diameters, both average diameters being from 5 nm to 50 nm; and
at least one electroactive chemical, wherein the electroactive chemical binds to the surface of the nanoparticles; and
at least one organic binder material,
wherein the conductive layer is disposed on the second surface of the substrate, and the electroactive layer is disposed on the conductive layer;
b) an electrolyte layer disposed on the working electrode;
c) a counter electrode disposed on the electrolyte layer; and
d) a reflective layer positioned between the working electrode and the counter electrode, wherein the reflective layer comprises a reflective porous membrane and the reflective porous membrane comprises at least one polymer, and at least one kind of reflective particle.

* * * * *